(12) United States Patent
Takashima et al.

(10) Patent No.: US 7,947,347 B2
(45) Date of Patent: May 24, 2011

(54) VACUUM HEAT INSULATOR

(75) Inventors: Hiroyuki Takashima, Neyagawa (JP); Kouji Yamashita, Osaka (JP)

(73) Assignee: Kurashiki Bosek Kabushiki Kaisha, Kurashiki-shi (JP)

( * ) Notice: Subject to any disclaimer, the term of this patent is extended or adjusted under 35 U.S.C. 154(b) by 353 days.

(21) Appl. No.: 11/632,911

(22) PCT Filed: Jul. 19, 2005

(86) PCT No.: PCT/JP2005/013255
§ 371 (c)(1),
(2), (4) Date: Jan. 19, 2007

(87) PCT Pub. No.: WO2006/009146
PCT Pub. Date: Jan. 26, 2006

(65) Prior Publication Data
US 2008/0095970 A1    Apr. 24, 2008

(30) Foreign Application Priority Data

| | | |
|---|---|---|
| Jul. 20, 2004 | (JP) | 2004-211678 |
| Aug. 23, 2004 | (JP) | 2004-242113 |
| Nov. 30, 2004 | (JP) | 2004-346728 |
| Dec. 7, 2004 | (JP) | 2004-353542 |
| Dec. 28, 2004 | (JP) | 2004-379281 |
| Mar. 31, 2005 | (JP) | 2005-102028 |

(51) Int. Cl.
*B32B 1/02*    (2006.01)
*B32B 27/00*   (2006.01)
*B32B 27/04*   (2006.01)
*B32B 27/02*   (2006.01)

(52) U.S. Cl. ............ 428/34.1; 428/35.7; 428/35.9; 428/34.2; 428/36.1; 428/36.3

(58) Field of Classification Search ............... 428/34.1, 428/34.2, 35.7, 35.9, 36.1, 36.3
See application file for complete search history.

(56) References Cited

U.S. PATENT DOCUMENTS

| | | | | |
|---|---|---|---|---|
| 4,101,525 | A | * | 7/1978 | Davis et al. .............. 528/308.2 |
| 5,693,399 | A | * | 12/1997 | Himeshima et al. ........... 428/69 |
| 2003/0043541 | A1 | | 3/2003 | Yuasa et al. |
| 2006/0024469 | A1 | | 2/2006 | Tenra et al. |

FOREIGN PATENT DOCUMENTS

JP    04-225775 A    8/1992

(Continued)

OTHER PUBLICATIONS

Japanese Patent Office, Office Action dated Sep. 25, 2009 for App. No. JP 2004-242113 (including English translation thereof).

(Continued)

*Primary Examiner* — Marc A Patterson
(74) *Attorney, Agent, or Firm* — Birch, Stewart, Kolasch & Birch, LLP

(57) ABSTRACT

The present invention provides a heat insulator that is extremely low in environmental load during production and recycling, is superior in handleability and workability, and shows favorable heat-insulating properties over an extended period of time.

The present invention relates to vacuum heat insulator, comprising at least a core member and an external packaging member that stores the core member and can keep inside under reduced pressure, wherein the core member is a sheet-shaped fiber aggregate containing a polyester fiber having fiber size of 1 to 6 deniers in an amount of 50 wt % or more.

16 Claims, 7 Drawing Sheets

FOREIGN PATENT DOCUMENTS

| | | |
|---|---|---|
| JP | 6-213561 A | 8/1994 |
| JP | 7-91594 A | 4/1995 |
| JP | 8-28776 A | 2/1996 |
| JP | 8-303686 A | 11/1996 |
| JP | 9-4785 A | 1/1997 |
| JP | 9-131823 A | 5/1997 |
| JP | 2000-28083 A | 1/2000 |
| JP | 2000-170069 A | 6/2000 |
| JP | 2001-350546 A | 12/2001 |
| JP | 2002-174485 A | 6/2002 |
| JP | 2002-188791 A | 7/2002 |
| JP | 2002-333092 A | 11/2002 |
| JP | 2002-339216 A | 11/2002 |
| JP | 2002-339217 A | 11/2002 |
| JP | 2003-155651 A | 5/2003 |
| JP | 2004-36749 A | 2/2004 |
| JP | 2004-100337 A | 4/2004 |
| JP | 3528846 B1 | 5/2004 |
| JP | 2004-197935 A | 7/2004 |
| JP | 2004-197954 A | 7/2004 |
| JP | 2004-239300 A | 8/2004 |
| JP | 2006-177497 A | 7/2006 |

OTHER PUBLICATIONS

Notification of Reasons for Refusal issued in Japanese Application No. 2005-362132 (with English translation) on Feb. 2, 2010.

Japanese Office Action issued Sep. 14, 2010, in corresponding Japanese Application No. 2007-301871.

Japanese Office Action issued Sep. 21, 2010, in corresponding Japanese Application No. 2004-379281.

Japanese Application No. 2005-102028, Japanese Office Action, Nov. 16, 2010, 3 pages.

* cited by examiner (A)

(B)

I-I (A)

(B)

(A)

(B)

II - II (A)

(B)

(A)

(B)

III - III (A)

(B)

VACUUM HEAT INSULATOR

TECHNICAL FIELD

The present invention relates to a vacuum heat insulator for use as a heat insulator for refrigerator, vending machine, cooling box, refrigerator truck, hot water tank, ice tank, vacuum insulating piping, molded head lining of automobiles, bath tub, and others.

BACKGROUND ART

Various heat insulators different in structure and characteristic have been used for insulation of refrigerator, vending machine, cooling box, refrigerator truck, hot water tank, ice tank, vacuum insulating piping, molded head lining of automobiles, bath tub, and others. Recently, many vacuum heat insulators showing superior heat-insulating properties have been used in these applications. Such a vacuum heat insulator generally has a structure prepared by placing a core member in a gas-barrier external packaging member, for example, of a metal-deposited film and sealing it while making inside under reduced pressure. The heat-insulating properties, productivity, and handleability of such a vacuum heat insulator depend largely on the core member described above, and examples of the core members commonly used recently include open-cell polyurethane foams (Patent Document 1), glass fiber aggregates (Patent Documents 2 and 3) and composites of glass fiber aggregate and other thermoplastic resin (Patent Document 4).

However, the commonly-used core members for vacuum heat insulator described above still have the following problems. Core members of open-cell polyurethane foam are very superior in workability, handleability, lightness in weight, and others, but inferior in heat resistance to fibrous materials such as glass fiber.

Core members of glass fiber aggregate are very superior in heat-insulating properties without generation of out-gas (gases vaporizing form core member), but have a disadvantage in the handleability and workability of the glass fiber itself. Although there are efforts to improve handleability, for example to improve operation of inserting a core member into the external packaging member, by needle-punching a sheet of glass fiber, it was not possible to overcome the difficulties in handling and workability derived from the material itself. In particular, there still remain problems in working environment and handling, when the core member is recycled. For example, seal opening of the external packaging member during recycling results in scattering of the glass fiber aggregate core member, causing problems in handleability and workability and also in environmental load.

Core members in combination of a glass fiber aggregate and other thermoplastic fiber are improved in handling to some extent but not sufficiently. In particular, Patent Document 4 discloses a core member consisting of 80 percent by mass glass wool and 20 percent by mass polypropylene resin fiber that is processed into a matt-shaped form by a heat pressing method. However, the core member still has problems of the deterioration in workability due to the glass wool itself and the deterioration in heat-insulating properties with time due to out-gas generated from the polypropylene resin fiber. In addition, combined use of organic and inorganic fibers makes fractionation after use very difficult and thus, results in very poor recycling efficiency. Although there are some reports on composites with rock wool, pulp, or the like, similarly to the composite with a thermoplastic fiber, use of a glass fiber inevitably causes the problems of the poor handleability and workability and high environmental load inherent to the glass fiber.

Although a vacuum heat insulator made only of an organic fiber, for example of a thermoplastic fiber, may possibly be used as a core member, there is no such commercially available heat insulator because of the problem of out-gas from the organic fiber. Use of a 0.75-d polyester fiber floc as a core member was studied (Patent Document 5), but use of the fiber floc resulted in deterioration in handleability, and thus, prohibits production of practical products. It is possible to process the fiber floc into sheet for improvement in handleability, but as described above, it is difficult to use a needle-punching method when an ultra-thin fiber is used, and use of a chemical bonding method leads to generation of out-gas, causing problems of larger change and drastic deterioration in heat-insulating properties with time.

On the other hand, use of vacuum heat insulators is expanding steadily recently. A vacuum heat insulator may be used in the application for improving thermal efficiency of tanks and piping, for example, while covering a cylindrical tank of water supply equipment or a cylindrical pipe in piping facility from external surface. In such an application, the vacuum heat insulator should be deformed along the peripheral surface of the tank or pipe and bonded thereto, and thus, should have a through-hole or notched area, for example, for incorporating wiring and piping or a groove for bending. However, it was difficult to bend a conventional thick core member having a vacuum thickness of 10 mm or more after evacuation. Even if it was possible to deform a core member easily before evacuation, it was difficult to produce a vacuum heat insulator by using the deformed core member.

It may be possible to make the post-evacuation deformation easier, by reducing the thickness of the core member after evacuation, for example, to 5 mm or less. However, when a glass fiber having an average fiber length of 1 mm or less was used as a core member, reduction in thickness resulted in insufficient curved-surface processability. Even if the vacuum heat insulator obtained may be easily deformed, the vacuum heat insulator could not be used easily for wrapping and lead to insufficient adhesion if used, because it tends to go back to its original flat plate shape and leave relatively large cockles generated when it is bent.

For forming a through-hole area or a notched area in a vacuum heat insulator, reported is a method of placing a flat plate-shaped insulating core member having a through-hole and/or a notch into a bag of a gas-barrier packaging material through its opening, evacuating the bag to a desirable vacuum, and forming a sealed region along the internal peripheral area in the vacuum heat insulator side of the through-hole area and/or the notched area by sealing the gas-barrier packaging materials therein to each other and a sealed region in the opening area by sealing the gas-barrier packaging materials therein to each other by contact of a heating unit under (Patent Document 6).

However, if a hard core member such as open-cell resin foam or inorganic powder is used, when the external covering material (external packaging member) in the internal peripheral area of the through-hole area or the notched area is evacuated or the cover material is sealed, a large load is applied to the internal peripheral area and causes fracture of the covering material and significant separation of the covering material from the core member, although such a phenomenon depends on the flexibility or the kind of the covering material used. A similar problem arises when multiple core members are placed in an external packaging member and the rear faces of the external packaging member are sealed to each other along the periphery of the external packaging member and the external periphery of the core members. Problems often arise in the regions particularly between multiple core members in the evacuation step.

It may be possible to smoothen the surface of the core member and thus to raise the adhesiveness between the covering material and the core member, but it demands an additional chamfering of the core member, which leads to decrease in productivity. It is even difficult to smoothen the surface of the core member, especially if it is an inorganic material.

Each of the vacuum heat insulators above is prepared by placing a core member directly in an external packaging member, making the external packaging member evacuated inside, and sealing the opening of the external packaging member, but the method raised a problem in productivity of the vacuum heat insulator. Specifically, when a core member is placed directly in an external packaging member, the external packaging member often suffers scratches, resulting in decrease in the yield of vacuum heat insulator. Also when a core member is placed directly in an external packaging member, the core member easily adheres to the finally-sealed opening in the external packaging member, for example electrostatically, tightly to the extent that the deposited core member cannot be removed sufficiently, and thus, sealing of the opening results in formation of an air vent derived from the deposited core member interconnecting inside and outside of the external packaging member and thus in decrease in the yield of vacuum heat insulator. Such a problem of decrease in yield was particularly distinctive, when a difficult-to-handle fiber floc was used as a core member. In addition, when a core member of fiber floc is placed directly in an external packaging member, the filling operation is restricted for prevention of the scratches on the external packaging member as described above, and thus, it was difficult to fill the core member to a uniform thickness, which lead to decrease in heat-insulating properties.

Patent Document 1: Japanese Unexamined Patent Publication No. 6-213561
Patent Document 2: Japanese Unexamined Patent Publication No. 8-28776
Patent Document 3: Japanese Unexamined Patent Publication No. 9-4785
Patent Document 4: Japanese Unexamined Patent Publication No. 2003-155651
Patent Document 5: Japanese Unexamined Patent Publication No. 2002-188791
Patent Document 6: Japanese Unexamined Patent Publication No. 08-303686

DISCLOSURE OF INVENTION

Technical Problems to be Solved

The present invention includes first, second and third inventions, and objects of these inventions are in common to provide a heat insulator that is extremely low in environmental load during production and recycling, is superior in handleability and workability, and shows favorable heat-insulating properties over an extended period of time.

In particular, the second invention is to provide a vacuum heat insulator having a through-hole area and/or a notched area or containing multiple core members that is superior in adhesiveness between the external packaging member and the core member and resistant to fracture of its external packaging member.

In particular, the third invention is to provide a vacuum heat insulator higher in productivity.

Means to Solve the Problems

The first invention relates to a vacuum heat insulator, comprising at least a core member and an external packaging member that stores the core member and can keep inside under reduced pressure, wherein the core member is a sheet-shaped fiber aggregate containing a polyester fiber having fiber size of 1 to 6 deniers in an amount of 50 wt % or more.

The second invention relates to the vacuum heat insulator according to the first invention, wherein the external packaging member has a sealed region where rear faces of the external packaging member are fused to each other in the peripheral edge area and the area inside the peripheral edge area of the external packaging member.

The third invention relates to the vacuum heat insulator according to the first invention, wherein an internal packaging member containing the core member is contained in the external packaging member under reduced pressure.

Core members of organic fiber were not considered seriously as a core member for vacuum heat insulators, for example, because of the problem of deterioration in heat-insulating properties by out-gas generated, but the inventors have studied a polyester fiber having a particular diameter and found that a sheet of a particular polyester fiber showed a heat-insulating properties higher than that of conventional open-cell polyurethane foams over an extended period of time, and completed the present invention.

EFFECTS OF THE INVENTION

The vacuum heat insulators according to the first to third inventions comprises the core member constituted by polyester fiber, being low in environmental load, and being very superior in recycling efficiency after use. In addition, the vacuum heat insulators according to the first and third inventions show a heat-insulating properties higher than that of the vacuum heat insulators constituted by open-cell polyurethane foam for use in refrigeratand/or others over an extended period of time, and are superior in handleability and workability when compared to those of glass fiber.

In particular in the first invention, a thin core member having a post-evacuation thickness in a particular range shows distinctive improvement in curved-surface processability. The polyester fiber, particularly polyethylene terephthalate fiber, for the core member is flexible and thus, deforms smoothly in the heat insulator even after evacuation. Such a vacuum heat insulator has a relatively small restoring force even when deformed, and there are smaller and fewer creases. For that reason, the vacuum heat insulator allows easier wrapping around cylindrical tanks in water supply equipment and cylindrical pipes in piping facility and also sufficiently tight adhesion thereto. The vacuum heat insulator also shows a heat-insulating properties greater than that of the vacuum heat insulator of an open-cell foam, and is superior in handleability in comparison to that of glass fiber.

In particular in the first invention, when a core member containing at least two kinds of polyester fibers different in melting point is used, it is possible to process it into sheet by a thermal-bonding method at relatively low temperature and thus to improve handleability and workability of core member, while suppressing generation of out-gas. In particular, its handleability and workability are significantly improved from those of conventional fibrous core materials, and become at levels almost equivalent to those of the polyurethane-foam plate-shaped core members.

The vacuum heat insulator according to the second invention, which includes a core member having a through-hole area and/or a notched area or multiple core members, can be used in various applications. The vacuum heat insulator also contains a polyester fiber core member higher in flexibility, and thus, causes fewer fracture of the external packaging member in the internal peripheral area of the through-hole area and/or notched area or in the external periphery of the core members when multiple core members are placed in the external packaging member during evacuation, and is superior in adhesiveness between the external packaging member and the core member.

In the vacuum heat insulator according to the third invention, in which the core member is contained in the external packaging member with the core member enclosed in an internal packaging member, the external packaging member is less vulnerable to scratches, and the core member is less likely to adhere to the opening of the external packaging member, which leads to improvement in yield of the vacuum heat insulat and/or thus in productivity.

EXPLANATION OF REFERENCE NUMERAL

Figure 1:
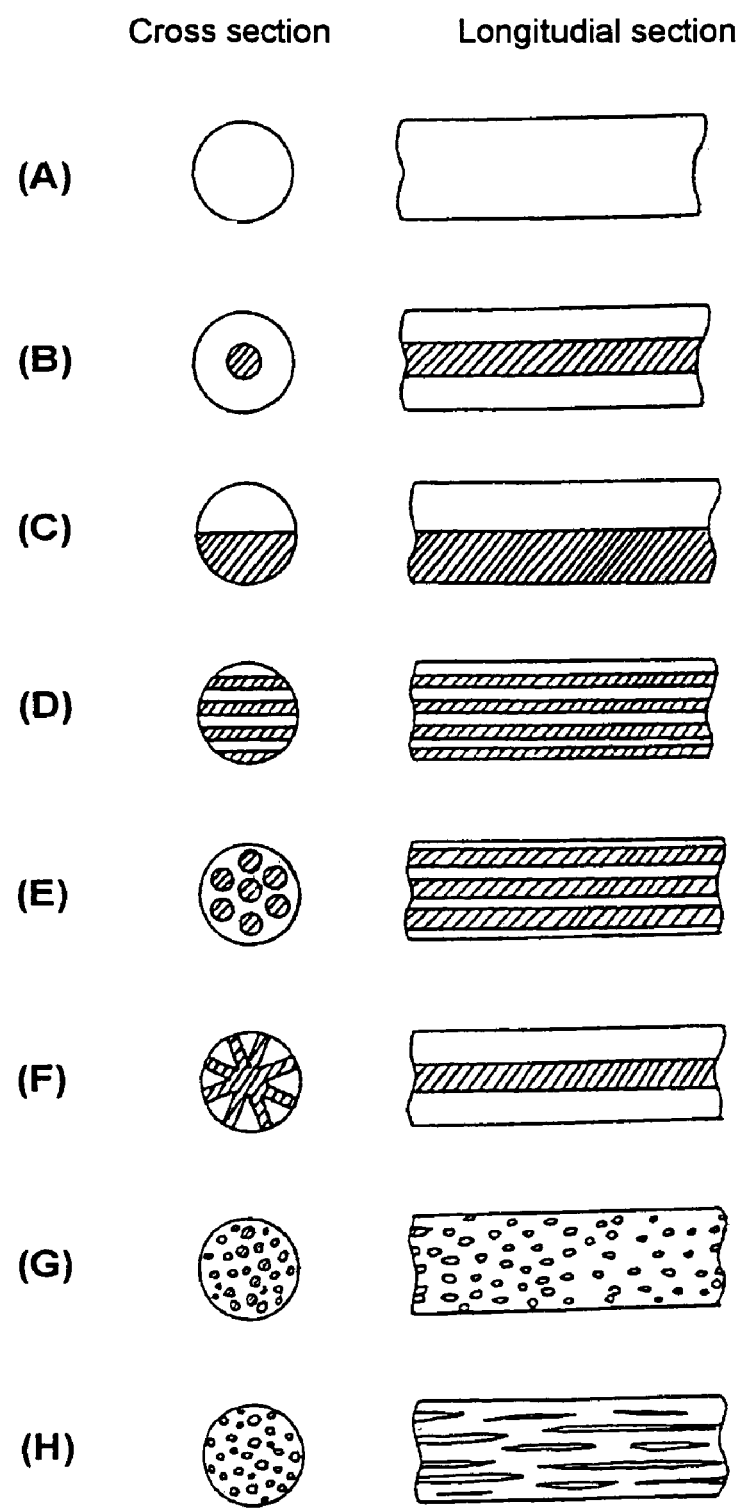
FIGS. 1(A) to (H) are schematic views illustrating examples of the structure of a composite fiber of low- and high-melting-point polyester fibers.

1: Core member,
2: External packaging member,
3A, 3B, 3C, 3D and 3E: sealed region,
3F: through-hole area of vacuum heat insulator,
3G: sealed region formed in step (c),
5: Through-hole area in core member,
6: Rear faces of external packaging member adsorbed to each other,
11: Core member,
12: External packaging member,
13A, 13B, 13C, 13D and 13E: Sealed region,
13F: Part of notched area,
13G: Sealed region formed in step (c),
15: Through-hole area in core member,
16: Rear faces of external packaging member adsorbed to each other,
21: Core member,
22: External packaging member,
23A, 23B, 23C, 23D and 23E: Sealed region, and
26: Rear faces of external packaging member adsorbed to each other.

BEST MODE FOR CARRYING OUT THE INVENTION

First Invention

The vacuum heat insulator according to the first invention comprises at least a core member and an external packaging member that stores the core member and can keep inside under reduced pressure.

In the first invention, the core member in the first embodiment is a sheet-shaped fiber aggregate containing a polyester fiber having fiber size of 1 to 6 deniers, preferably 1 to 3 deniers. Specifically, the core member is a fiber aggregate containing the polyester fibers processed into a sheet shape, and use of such a core member improves handleability and workability and also reduces the environmental load during production and recycling. Favorable heat-insulating properties is demonstrated over an extended period of time. The average diameter of the fiber above is normally 9 to 25 µm, preferably 9 to 17 µm. The average diameter is an average of the diameters at two positions respectively of ten fibers (a total of 20 points), as determined by using a CCD camera.

The term "sheet" means that the aggregate is in a flat plate shape. If the core member is not sheet-shaped, for example, when the fiber aggregate is used in the floc state, the handleability of the core member declines, making the step of placing the core member in the external packaging member more complicated and thus, leading to lowering in workability. The initial heat-insulating property is not obtained.

The thickness of the sheet-shaped fiber aggregate (core member) in the first embodiment is not particularly limited, if the object of the first invention is achieved, but normally, may be approximately 0.1 to 100 mm, preferably approximately 1 to 50 mm, particularly preferably approximately 5 to 20 mm, in the shape of vacuum heat insulator (after evacuation). When the thickness of the sheet-shaped fiber aggregate (core member) in the form of vacuum heat insulator is thinner in the range above, in particular 0.1 mm to 5 mm, the surface processability under after evacuation improves. In particular, a thickness of approximately 0.5 to 3.5 mm is favorable from the points both of heat-insulating properties and productivity. In measuring the thickness of the core member (after evacuation), the thickness of the external packaging member can be neglected as it is very small.

The sheet-shaped fiber aggregate may be a sheet of one layer, but a thick vacuum heat insulator of approximately 5 mm or more in thickness of mono-layered polyester fiber is difficult to produce and thus, use of a sheet-shaped fiber aggregate (core member) of two or more laminated sheets is preferable. The fiber aggregate is preferably prepared without use of other materials such as binder, and, for example, is processed into sheet by a so-called needle-punching method. Chemical bonding and other methods of using a binder causes a problem of deterioration in heat-insulating properties with time by the out-gas generated. The fiber aggregate prepared by the needle-punching method has favorable sliding property among fibers and better surface processability. The needle-punching method is a method of forming a sheet by punching a polyester fiber floc in which the fibers are oriented in a certain direction to some extent, i.e., a polyester fiber web, vertically and reciprocally with multiple needles with a hook and thus entangling the fibers with each other in the web.

A polyester fiber having an excessively smaller average fiber diameter prohibits use of a needle punching machine, and demands use of it as fiber floc or processing into sheet by a chemical bonding method, which also causes the problems above. On the other hand, a fiber having an excessively larger average fiber diameter leads to decline of heat-insulating properties, demanding increase in density for obtaining favorable heat-insulating properties, which causes a problem of weight increase. Use of other organic fiber such as polyethylene fiber replacing polyester fiber leads to deterioration in heat-insulating properties with time by the out-gas generated.

In the present description, the polyester fiber means a fiber of a polymer in which its chemical structural units are bound to each other via an ester bond, and the production method is not particularly limited. For example, it may be a polyester fiber obtained in reaction of a dicarboxylic acid component and a diol component, or a polyester fiber obtained in mutual reaction of a hydroxy carboxylic acid component having a hydroxyl group and a carboxyl group in the molecule.

Typical examples of the polyester fibers include polyethylene terephthalate (PET) fiber, polybutylene terephthalate (PBT) fiber, polypropylene terephthalate fiber, polyarylate fiber, and the like. For example, the PET fiber is prepared in reaction of dimethyl terephthalate (DMT) and ethylene glycol (EG), or terephthalic acid (TPA) and EG, while the PBT fiber in reaction of DMT and tetramethylene glycol (TMG) or of TPA and TMG. Considering sheet-forming efficiency, mass productivity and cost, polyethylene terephthalate fiber is preferable. There is no problem in using recycled PET fiber at all.

The polyester fiber is not particularly limited, but a polyester fiber having a softening point around at 200 to 260° C. and a strength of approximately 0.3 to 1.2 GPa is preferable from the viewpoint of easiness in producing fiber.

Examples of the methods of producing polyester fiber include melt spinning, wet spinning, dry spinning, and the like, but melt spinning is preferable. The melt spinning method is a method of extruding a molten polymer through a micropore nozzle into air, cooling and solidifying the extruded molten fiber in air while stretched, and winding the solidified fiber at a certain speed. It is possible to produce a polyester fiber having the fiber size described above easily by the method.

The favorable fiber length (average fiber length) of the polyester fiber is 10 to 150 mm. A length of shorter than 10 mm makes it difficult to process it into sheet. A length of longer than 150 mm leads to deterioration in heat-insulating properties. The length is preferably 20 to 80 mm.

The content of the polyester fiber in the fiber aggregate is not particularly limited, if the object of the first invention is achieved, but normally, 50 wt % or more, preferably 90 to 100 wt %, with respect to the total amount of the core member, for prevention of deterioration in heat-insulating properties with time by the out-gas generated. Most preferably, the core member is made only of a polyester fiber, for further improvement in heat-insulating properties.

Examples of the other fibers that may be used in combination with the polyester fiber in the fiber aggregate include synthetic fibers such as polyethylene fiber, polypropylene fiber, acrylic fiber, aramid fiber, nylon fiber, polyvinyl alcohol fiber, fluorine fiber, polyurethane fiber, polynosic fiber, and rayon fiber; inorganic fibers such as alumina and potassium titanate; natural fiber such as hemp, silk, cotton, and wool; and the like.

In the first invention, the density of the core member in the first embodiment is preferably 100 to 450 kg/m$^3$, in particular 100 to 300 kg/m$^3$, more preferably 150 to 300 kg/m$^3$. An excessively smaller density leads to deterioration in strength as a core member and also to deterioration in heat-insulating properties. On the other hand, an excessively larger density leads to increase in weight and deterioration in heat-insulating properties. Accordingly, both excessive increase and decrease in density lead to deterioration in heat-insulating properties. The density most preferable at the average fiber diameter is 170 to 270 kg/m$^3$, in particular 180 to 250 kg/m$^3$.

In the present description, the density of the core member is determined by measuring a core member contained in an external packaging member after evacuation. Specifically, after preparation of a vacuum heat insulator, the weight of the core member is determined by subtracting the weights of the external packaging member, gas-adsorbing member, and others previously measured from the weight of the vacuum heat insulator. In addition, the volume of the core member is calculated by subtracting the volume of the gas-adsorbing member and others previously determined from the volume of the vacuum heat insulator. The volume of the external packaging member, which is very thin, is neglected. The density is calculated from the weight and volume of core member thus obtained.

The core member in the second embodiment of the first invention, is a sheet-shaped fiber aggregate containing polyester fibers having a diameter of 1 to 6 deniers, preferably 1 to 3 deniers, wherein the polyester fibers includes at least two kinds of polyester fibers different in melting point, i.e., at least a polyester fiber having a relatively low melting point (hereinafter, referred to as low-melting-point polyester fiber) and a polyester fiber having a relatively high melting point (hereinafter, high-melting-point polyester fiber). Use of such a core member is effective in reducing environmental load during production and recycling and increasing heat-insulating properties. Use of at least two kinds of polyester fibers different in melting point permits processing of the fiber aggregate into sheet by thermal bonding at relatively low temperature, and thus improves handleability and workability of the core member, while suppressing generation of out-gas. In particular, the surface of the sheet-shaped core member obtained is almost not raised and thus, the bulkiness thereof is reduced effectively by use of the thermal-bonding method, and, for that reason, the core member has handleability and workability drastically improve, compared to those of conventional fibrous core members, to a level similar to those of polyurethane-foam plate-shaped core members.

Hereinafter, the core member in the second embodiment will be described. The core member in the second embodiment is the same as the core member in the first embodiment, except that at least two kinds of polyester fibers different in melting point are used as polyester fibers, unless otherwise indicated.

In the second embodiment, the melting point of the low-melting-point polyester fiber ($T_L$) is not particularly limited, if the object of the first invention is achieved. Considering the heat needed in sheeting and also productivity, a fiber having a lower melting point is preferable, but if only thermal conductivity is considered, a lower-melting-point fiber is undesirable, because melting is accompanied with decrease in contact area among fibers. In short, selected is a melting point most preferable in consideration of productivity, cost and thermal conductivity. Normally, the low-melting-point polyester fiber has a low melting point of 110 to 170° C., preferably 110 to 150° C.

The melting point of the high-melting-point polyester fiber ($T_H$) is not particularly limited, if it is higher than the melting point of the low-melting-point polyester fiber ($T_L$), but from the viewpoint of productivity, the high-melting-point polyester fiber has a melting point preferably higher by 20° C. or more than that of the low-melting-point polyester fiber. The high-melting-point polyester fiber has normally a high melting point of 240 to 280° C., preferably 250 to 270° C.

Use only of a low-melting-point polyester fiber without a high-melting-point polyester fiber prohibits sheeting by the thermal-bonding method, because the fiber aggregate is molten into an undefined resin mass by the heat treatment of the thermal-bonding method. Use only of a high-melting-point polyester fiber without a low-melting-point polyester fiber only permits processing by a sheet-forming method without use of a binder such as needle-punching method, because the low-melting-point polyester fiber for sheeting is not contained, and also prohibits further improvement in efficiency of enclosing a core member in the external packaging member, i.e., workability.

Generally as shown in the schematic view of FIG. 1, the structures of the fiber are roughly grouped into a so-called normal structure (FIG. 1(A)) of one component, composite structures (FIGS. 1(B) to (F)) and mixed structures (FIGS. 1(G) to (H)) of multiple components. The composite structure is a structure wherein multiple components have respectively structures continuous in the fiber length direction and are bound to each other in a single fiber. Two-component composite structure is further divided into so-called core/shell structure (FIG. 1(B)) and side-by-side (parallel) structure (FIG. 1(C)); and 2- or more-component multilayer composite structure is also divided into so-called multi-parallel structure (FIG. 1(D)), multi-core structure (FIG. 1(E)), and radial structure (FIG. 1(F)). The mixed structure is a structure wherein at least one component is granular or acicular in shape and dispersed in another component (matrix component) discontinuously in the fiber length direction, and is divided into granular mixed structure (FIG. 1(G)) and acicular mixed structure (FIG. 1(H)).

The fiber structure of the low-melting-point polyester fiber is not particularly limited, if it contains a polyester having such a low melting point, but preferably, a structure in which at least part of the fiber surface is made of the low-melting-point polyester, such as the structure represented by any one of FIGS. 1(A) to (H). More preferable low-melting-point polyester fiber has a structure wherein the entire fiber surface is made of a low-melting-point polyester, for example, one of the structures represented by FIGS. 1(A), (B), (E), (G) and (H). When the low-melting-point polyester fiber has a structure represented by one of FIGS. 1(A) to (H), the resin in the hollow region of FIGS. 1(A) to (H) is made of a low-melting-point polyether, and the resin of the hatched region is not particularly limited, and is for example, polyester, polyethylene, polypropylene, nylon, or the like. The melting point of the polymer in the hatched region is not particularly limited. The polyester in the hatched region is a polyester different in melting point and/or raw material monomer from the low-melting-point polyester.

The low-melting-point polyester fiber preferably is a polyester fiber in the core/shell structure shown in FIG. 1(B), from the viewpoint of convenience in sheet production. Then, the resin in the shell region (hollow region) of FIG. 1(B) is preferably made of a low-melting-point polyester (preferably PET), and the resin in the core region (hatched region), a high-melting-point polyester (in particular, PET).

The fiber structure of the high-melting-point polyester fiber is not particularly limited, if the fiber contains a high-melting-point polyester, and preferably a structure wherein part of the fiber surface is made of a high-melting-point polyester, for example, one of the structures represented by FIGS. 1(A) to (H). More favorable high-melting-point polyester fiber has a structure wherein all of the fiber surface is made of a high-melting-point polyester, for example one of the structures represented by FIGS. 1(A), (B), (E), (G) and (H). When the high-melting-point polyester fiber has one of the structures represented by FIGS. 1(A) to (H), the hollow region in FIG. 1(A) to (H) is made of a high-melting-point polyester, while the resin in the hatched region is not particularly limited and is, for example, polyester, polyethylene, polypropylene, nylon, or the like. The melting point of the polymer in the hatched region is not particularly limited. The polyester in the hatched region is a polyester different in melting point and/or raw material monomer from the high-melting-point polyester.

Most preferably from the viewpoint of sheet strength, the high-melting-point polyester fiber has the normal structure represented by FIG. 1(A). Then, the fiber shown in FIG. 1(A) is made only of a high-melting-point polyester (preferably PET).

All cross sections in FIGS. 1(A) to (H) are circular in shape, but, independently of whether FIGS. 1(A) to (H) show the structure of the lower- and high-melting-point polyester fiber, the cross section shown in FIGS. 1(A) to (H) should not be construed to be circular in shape, and may be, for example, almost circular, almost elliptic, almost star-shaped, almost polygonal, or the like.

The melting point in the present description is a value determined with a differential scanning calorimeter (DSC-7, manufactured by PerkinElmer Japan Co., Ltd.). Specifically, an endothermic peak of a crystal absorbing heat at the melting point is determined by differential scanning calorimetry. The melting point is determined by the endothermic peak. When a fiber contains two components, each component is separated from the fiber, for example by scraping, and supplied for analysis of melting point.

In the second embodiment, the diameters of the low- and high-melting-point polyester are respectively, independently selected in the range of 1 to 6 deniers, preferably 1 to 3 deniers. The fiber diameters above respectively correspond to "9 to 25 μm" and "9 to 17 μm".

The length of each of the low- and high-melting-point polyester fiber is also not particularly limited, and may be, for example, independently in the range of 17 to 102 mm.

Any one of known methods of producing fiber may be used for preparing the low- and high-melting-point polyester fibers, and the method is normally determined according to the structure of the fiber. For example, so-called melt spinning method, wet spinning method, dry spinning method, or the like may be used in forming a fiber having a normal structure, and a melt spinning method is used favorably. In the melt spinning method, a molten polymer at a particular melting point is extruded from a micropore nozzle into air, and the extruded molten fiber is cooled until solidification while stretched in air and then wound at a certain speed. It is possible to produce a polyester fiber having a diameter of approximately 1 to 6 deniers easily by the method.

For example, a mutually-oriented-polymer spinning method, a splittable-composite-fiber spinning method, or a multilayer-composite fiber spinning method may be used in forming a fiber having a core/shell structure, but the mutuallyoriented-polymer spinning method giving an island-in-sea composite fiber is favorably used. In the mutually-oriented-polymer spinning method, two kinds of fibers different in solubility, a sea component fiber and a small amount of an island component fiber, are blended and integrated into tow. The tow is fed into a funnel-shaped channel, heated and melted therein, and extruded out of the nozzle into a single filament. These filaments are collected and wound.

The fiber aggregate (core member) containing the low- and high-melting-point polyester fibers is processed into sheet normally by a thermal-bonding method. For improvement in the processability by thermal-bonding method, the fiber aggregate is preferably processed into sheet by a needle-punching method before the thermal-bonding method.

In the thermal-bonding method, the fiber aggregate is formed and processed into sheet, while it is heated and pressurized between two rollers, allowing fusion of the low-melting-point polyester region in low-melting-point polyester fiber and thus adhesion of the fiber surfaces. The method gives a sheet better in shape stability that is more easily placed in the external packaging member than that prepared by the needle-punching method. In the second embodiment, the heating temperature during processing can be made low because the fiber aggregate contains a low-melting-point polyester fiber. It is thus possible to prevent generation of out-gas and also to improve handleability and workability of the core member.

Processing into sheet, for example, by a common chemical bonding method that uses a low-melting-point organic binder results in deterioration in recycling and also in heat-insulating properties by the out-gas generation.

In the second embodiment, the thickness of such a sheet-shaped fiber aggregate (core member) is not particularly limited, if the object of the first invention is achieved, but normally approximately 1 to 50 mm, particularly approximately 5 to 20 mm, as a vacuum heat insulator. In the second embodiment, the surface of the sheet-shaped core member is raised little and thus, superior in handleability and workability, and therefore, the core member is favorably inserted into the external packaging member with two or more sheets laminated. It is difficult to produce a sheet-shaped core member having a thickness of approximately 50 mm or more under atmospheric pressure. Thus, the thickness of the sheet-shaped core member under atmospheric pressure is preferably 0.1 to 20 mm, particularly preferably 1 to 10 mm. Of course in the second embodiment, only a single-sheet core member may be used in inserting the core member into the external packaging member.

The blending rate of the low-melting-point polyester fiber to high-melting-point polyester fiber in the fiber aggregate of second embodiment is preferably 5:95 to 50:50, particularly 10:90 to 30:70 by weight, for further improvement of heat-insulating properties.

The total content of the low- and high-melting-point polyester fibers in the fiber aggregate of second embodiment is not particularly limited, if the object of the first invention is achieved, but, normally 50 wt % or more, preferably 90 to 100 wt %, with respect to the total amount of the fiber aggregate, for more effective prevention of out-gas generation. For further improvement in heat-insulating properties, the core member most preferably contains only low- and high-melting-point polyester fibers.

Examples of other fibers that may be contained in the fiber aggregate together with the low- and high-melting-point polyester fibers include those similar to the "other fibers" in the first embodiment. The fiber aggregate may contain a polyester fiber different in melting point and/or raw material monomer from the low- and high-melting-point polyester fibers as the other fiber.

In the second embodiment, the density of the core member is preferably 100 to 350 kg/m$^3$, more preferably 150 to 330 kg/m$^3$, and most preferably 200 to 300 kg/m$^3$.

The external packaging member enclosing the core member in the first and the second embodiments is not particularly limited, if has gas-barrier property and can keep inside under reduced pressure, but it is preferably heat-sealable. Favorable examples thereof include a gas barrier film having a 4-layer structure of nylon, aluminum-deposited PET (polyethylene terephthalate), aluminum foil, and high-density polyethylene, in that order from the outermost layer to the innermost layer; a gas barrier film having a polyethylene terephthalate resin as an outermost layer, an aluminum foil as an intermediate layer, and a high-density polyethylene resin as an innermost layer; a gas barrier film having a PET resin as an outermost layer, and an ethylene-vinyl alcohol resin copolymer having an aluminum-deposited layer as an intermediate layer, and a high-density polyethylene resin as an innermost layer; and the like. Such an external packaging member is normally, processed into a bag shape for use, and, for example, three sides are heat-sealed, leaving one side open. In the external packaging members of the typical examples above, the innermost layer represents the rear face and thus, the innermost layer represents the inside of bag.

In the vacuum heat insulator of the first invention, although it is possible to obtain a heat insulator superior in heat-insulating properties only by placing the core member in the external packaging member, it is preferable to place the core member with a gas-adsorbing member adsorbing gases generated inside the vacuum heat insulator under vacuum, for example the out-gas and moisture generated from the core member and the gas and moisture invading from outside, for more improvement of the heat-insulating properties with time.

Although a gas-adsorbing substance in the shape of powder, granule, tablet, or the like may be used as it is as a gas-adsorbing member, the gas-adsorbing substance is preferably used as contained in an air-permeable container, from the viewpoint in handleability.

The gas-adsorbing substance is not particularly limited, and examples of the substances adsorbing gases and moisture physically include activated carbon, silica gel, aluminum oxide, molecular sieve, zeolite, and the like. Examples of the substances adsorbing gases and moisture chemically include calcium oxide, barium oxide, calcium chloride, magnesium oxide, magnesium chloride, metal powders of iron, zinc, and others, barium-lithium alloys, zirconium alloys, and the like.

The air-permeable container in which the gas-adsorbing substance is contained is not particularly limited, if the object of the first invention is achieved, and examples thereof include hard containers such as metal container and plastic container, soft containers such as paper bag, film bag, organic nonwoven fabric bag, and the like. The air permeability of the container is preferably larger in the range that the gas-adsorbing substance inside is less influenced by exposure, because an excessively smaller air permeability leads to elongation of the period needed for discharging the gas in the container by a vacuum pump in production of the vacuum heat insulator.

The gas-adsorbing substance is preferably contained in a soft bag as the gas-adsorbing member, from the viewpoint of the curved-surface processability of the vacuum heat insulator, especially when the core member is thin as described above. Typical materials for the soft bag include paper, porous polyethylene film, porous polypropylene film, polyester nonwoven fabric, polyethylene nonwoven fabric, nylon nonwoven fabric and the like; preferable is polyester nonwoven fabric; and among them polyethylene terephthalate nonwoven fabric is particularly preferable, because it is the same as the material favorable for the core member, specifically the polyester fiber core member, in particular polyethylene terephthalate fiber core member, and the material is less hygroscopic and very favorable in processability during surface processing. The weight per unit area of the nonwoven fabric for the bag is preferably 30 to 200 g/m$^2$, particularly 35 to 130 g/m$^2$, from the viewpoints of retentivity of the gas-adsorbing substance and workability in the vacuum process.

The polyester fiber and the polyethylene terephthalate fiber favorably used as a bag for gas-adsorbing member are respectively the same as the polyester fiber and polyethylene terephthalate fiber for the core member.

A favorable embodiment of the method of producing a vacuum heat insulator according to the first invention will be described below. A fiber aggregate is processed into sheet, for example, by a needle-punching method, to give a core member. When low- and high-melting-point polyester fibers are used, these fibers are mixed uniformly, and after orientation in one direction to some extent, the fiber is processed into a sheet shape for example by a needle-punching method, and then, into a strong dimensionally-stable sheet by a thermal-bonding method, to give a core member. The core member obtained is cut into pieces of a suitable size and shape (for example, square) and dried for removal of water contained therein. The drying is normally performed under the condition of 120° C. and 1 hour, but preferably performed at 120° C. under vacuum for more efficient removal of water in the polyester fiber. In particular, the low- and high-melting-point polyester fibers, when used, are dried under the condition of a temperature of 100° C. or higher and lower than the melting point of the low-melting-point polyester fiber ($T_L$), preferably $T_L$-10 to $T_L$-5 (° C.), for example, 100 to 105° C. for 1 hour, but preferably under vacuum for more removal of water and others in the polyester fiber at the temperature. In addition, far-infrared ray may be used in combination for drying, independently of the kinds of fibers, and drying at a vacuum of approximately 0.5 to 0.01 Torr is preferable.

Then, the core member is placed in an external packaging member sealed into a bag shape. A gas-adsorbing member may also be placed together then. The position of the gas-adsorbing member therein is not particularly limited, and the core member may be made thinner in the area of the gas-adsorbing member placed, from the viewpoint of surface smoothness. The external packaging member containing all of them is then placed in a vacuum apparatus, which is evacuated to an internal pressure of approximately 0.1 to 0.01 Torr. Then, the opening of the external packaging member bag is fused thermally, to give a vacuum heat insulator. It is possible to control the density of core member by pressing it at room temperature for adjustment of the thickness of the core member.

Second Invention

The vacuum heat insulator according to the second invention is a vacuum heat insulator according to the first invention having sealed regions where the rear faces of the external packaging member are fused to each other in the peripheral edge area and the area inside the peripheral edge area of the external packaging member. Unless otherwise indicated, the vacuum heat insulator according to the second invention is the same as the vacuum heat insulator according to the first invention except that the vacuum heat insulator has sealed regions where the rear faces of the external packaging member are fused to each other in the peripheral edge area and the area inside the peripheral edge area of the external packaging member. Hereinafter, the second invention will be described, but description of the elements same as those in the first invention is omitted.

Specifically, the vacuum heat insulator according to the second invention has at least a core member and an external packaging member containing the core member that can keep inside under reduced pressure, wherein the vacuum heat insulator has sealed regions where the rear faces of the external packaging member are fused to each other (hereinafter, referred to simply as "sealed regions") in the peripheral edge area and the area inside the peripheral edge area of the external packaging member. In the second invention, the area inside the peripheral edge area of external packaging member means an area surrounded by the sealed regions formed by the peripheral edge of external packaging member, and, for example, it is the region surrounded by sealed regions 3A, 3B, 3C and 3D, in FIG. 2(A), the region surrounded by sealed regions 13A, 13B, 13 C and 13D in FIG. 4(A), and the region surrounded by sealed regions 23A, 23B, 23 C and 23D in FIG. 6(A).

For example, the vacuum heat insulator shown in the schematic drawing of FIG. 2(A) has sealed regions in the peripheral edge areas (3A, 3B, 3 C and 3D) of the external packaging member 2 and also inside the peripheral edge areas (3E). Thus, the vacuum heat insulator shown in FIG. 2(A) has a through-hole area 3F (region hatched with dotted lines), and the rear faces of the external packaging member are sealed to each other in the peripheral edge areas (3A, 3B, 3C and 3D) of external packaging member and the internal peripheral area 3E of the through-hole area. In particular, the vacuum heat insulator shown in FIG. 2(A) has a through-hole area 3F (region hatched with dotted lines) and a sealed region 3E formed along the internal peripheral area in the vacuum heat insulator side of the through-hole area 3F. The area 3F is a region removed from the sealed region 3G. FIG. 2(B) is a schematic view of the cross section along I-I of the vacuum heat insulator shown in FIG. 2(A), wherein 1 represents a core member and 2 an external packaging member.

For example, the vacuum heat insulator shown in the schematic drawing of FIG. 4(A) has sealed regions in the peripheral edge areas of external packaging member 12 (13A, 13B, 13C and 13D) and an area inside the peripheral edge area (13E). Thus, the vacuum heat insulator shown in FIG. 4(A) has a notched area 13F (region hatched with dotted lines), and the rear faces of the external packaging member are sealed to each other in the peripheral edge areas of external packaging member (13A, 13B, 13C and 13D) and the internal peripheral area 13E along the notched area. In particular, the vacuum heat insulator shown in FIG. 4(A) has a notched area (entire region hatched with dotted lines), and there is a sealed region 13E formed along the internal peripheral area in the vacuum heat insulator side of the notched area 13F. The area 13F represents a region removed from the sealed region 13G formed. FIG. 4(B) is a schematic view of the cross section along II-II of the vacuum heat insulator shown in FIG. 4(A), wherein 11 represents a core member and 12, an external packaging member.

For example, the vacuum heat insulator shown by the schematic drawing of FIG. 6(A) has sealed regions in the peripheral edge areas of external packaging member (23A, 23B, 23C and 23D) and an area inside the peripheral edge area (23E). Thus in the vacuum heat insulator shown in FIG. 6(A), two or more core members are placed in the external packaging member, and the rear faces of the external packaging member are sealed to each other along the peripheral edge areas of external packaging member (23A, 23B, 23C and 23D) and the external peripheral areas of respective core members (23A, 23B, 23C, 23D and 23E). In particular, in the vacuum heat insulator shown in FIG. 6(A), the sealed region 23E forms a bending groove for bending use of the vacuum heat insulat and the groove has a bending function. FIG. 6(B) is a schematic sectional view showing the cross section along III-III of the vacuum heat insulator shown in FIG. 6(A), wherein 21 represents a core member and 22 is an external packaging member.

A core member similar to that according to the first invention may be used as core members (1, 11, or 21) according to the second invention. In the second invention, the core member may contain an inorganic fiber such as glass fiber (glass wool), alumina fiber, slag wool fiber, silica fiber, rock wool fiber, or the like.

When a through-hole area or a notched area is formed in the second invention, a region corresponding to the through-hole or notch is also formed in the core member. The region may be formed previously in the sheet-shaped fiber aggregate core member or the through-hole or notch region may be formed when it is placed in the external packaging member. The position of the through-hole or notched area formed is decided properly according to the application of the vacuum heat insulat and/or the shape and size of the through-hole or notched area are decided properly according to the application, i.e., according to the cross-sectional shape and size of the wire or device penetrating the through-hole, or the shape and size of the articles using the notched area. The shape of through-hole is normally circle, square, or polygon such as hexagon, but the through-hole or notched area is preferably circular for prevention of wrinkling of external packaging member, and, for example, the angular peaks at four corners are preferably rounded even when a square or polygonal through-hole is formed.

In the second invention, the thickness of the core member is not particularly limited, if the object of the second invention is achieved, but normally approximately 0.1 to 50 mm, particularly approximately 0.3 to 20 mm, and preferably approximately 0.5 to 5 mm, as a vacuum heat insulator.

Figure 2:
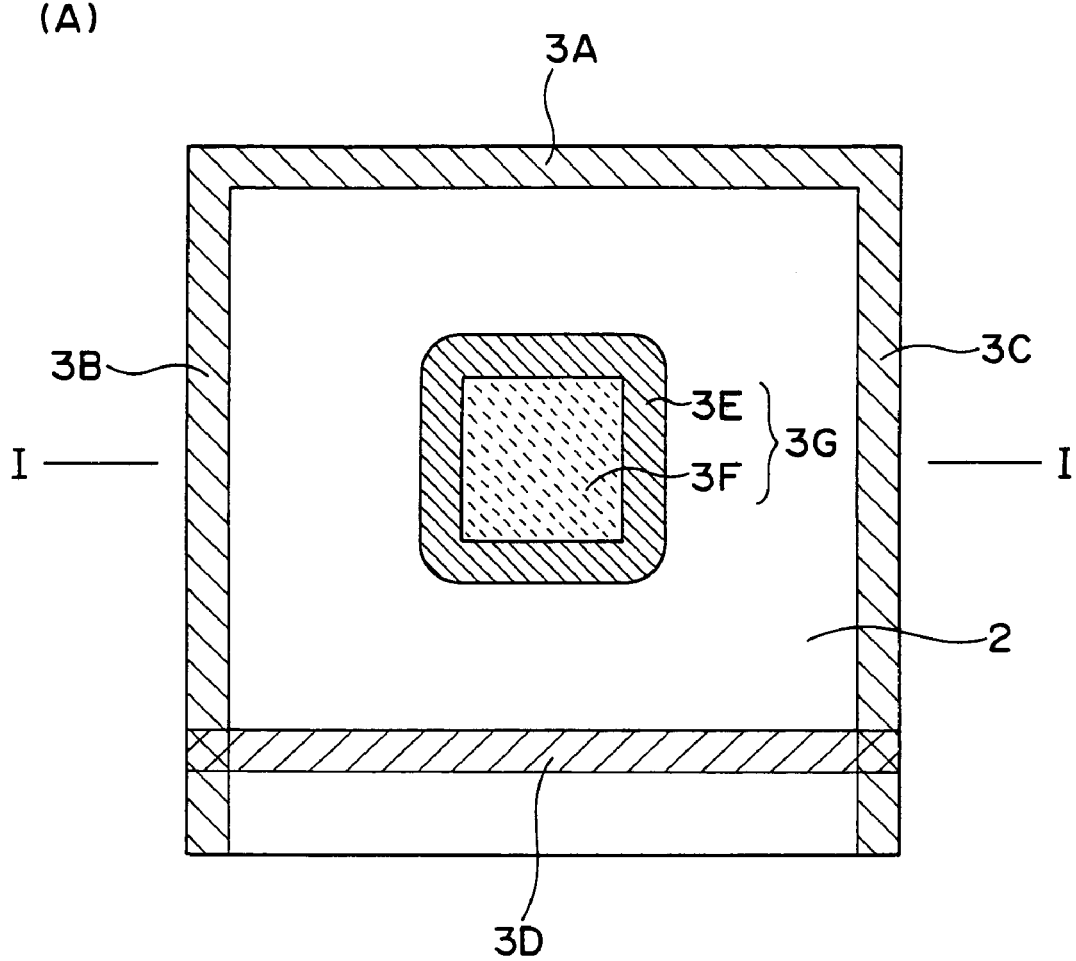
FIG. 2(A) is a schematic drawing illustrating an example of the vacuum heat insulator according to the second invention.
FIG. 2(B) is a schematic sectional view illustrating the cross section of the vacuum heat insulator shown in FIG. 2(A) along the line I-I.
Figure 2:
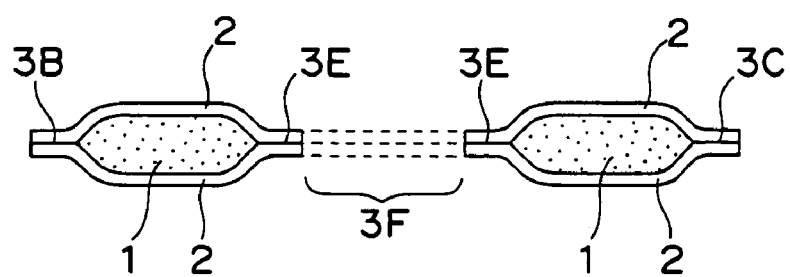
Figure 4:
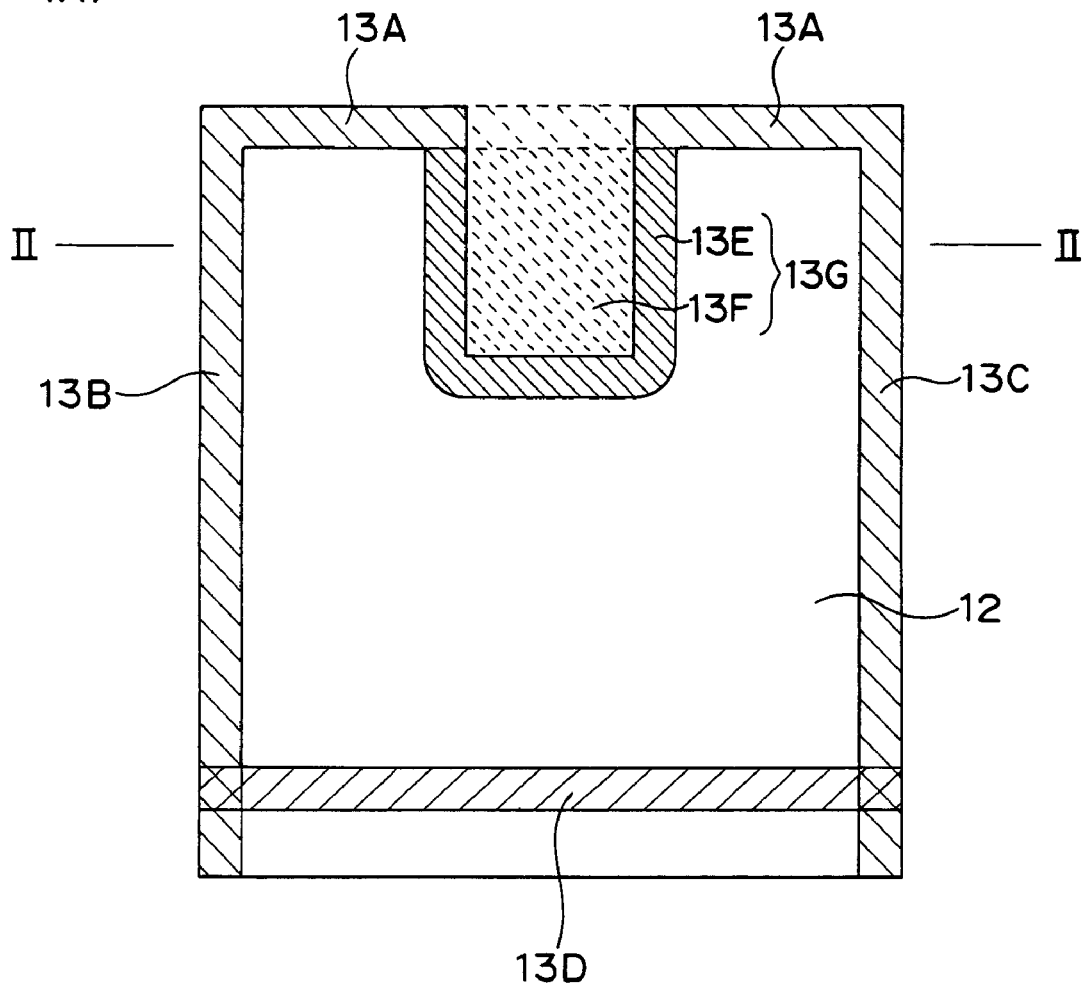
FIG. 4(A) is a schematic drawing illustrating an example of the vacuum heat insulator according to the second invention.
FIG. 4(B) is a schematic sectional view illustrating the cross section of the vacuum heat insulator shown in FIG. 4(A) along the line II-II.
Figure 4:
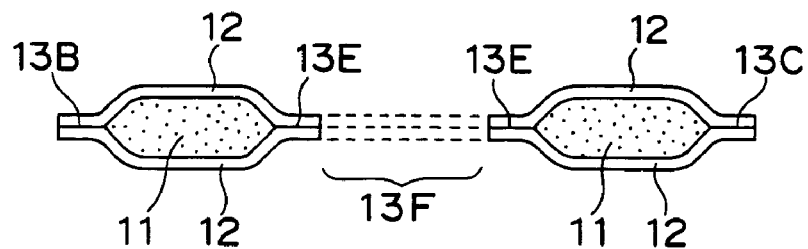
Figure 6:
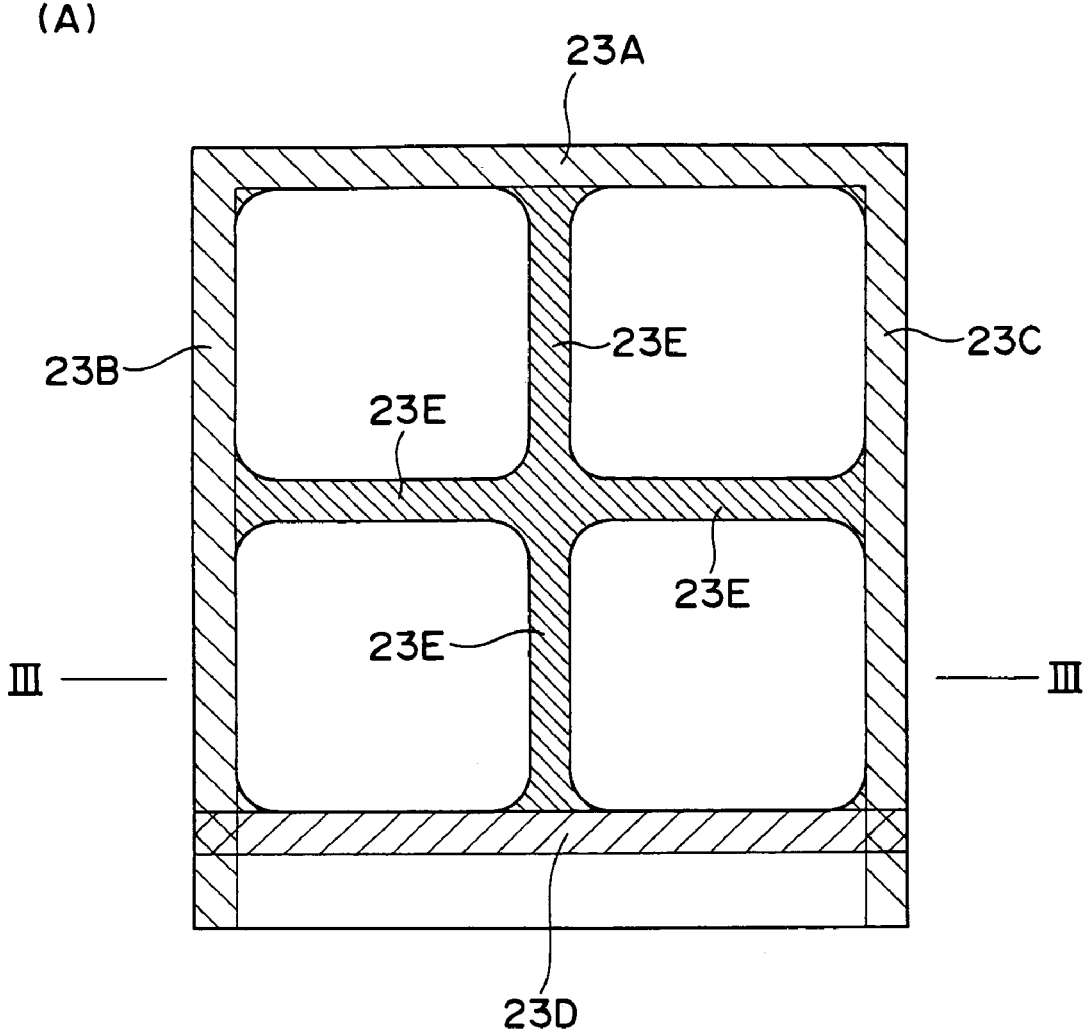
FIG. 6(A) is a schematic drawing illustrating another example of the vacuum heat insulator according to the second invention.
FIG. 6(B) is a schematic sectional view illustrating the cross section of the vacuum heat insulator shown in FIG. 6(A) along the line III-III.
Figure 6:
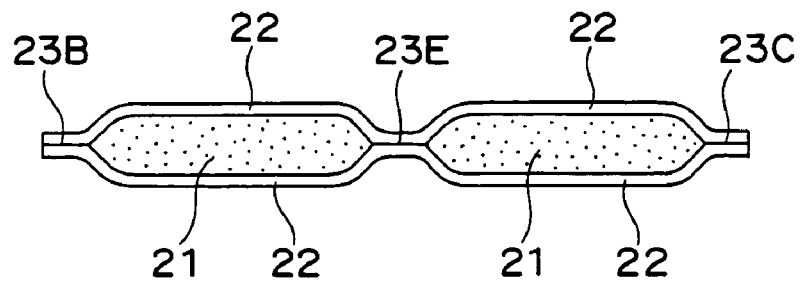

A favorable embodiment of the method of producing the vacuum heat insulator according to the second invention will be described with reference to FIGS. 2, 4 and 6. FIGS. 2(A) and (B) are respectively schematic planar and sectional views illustrating the vacuum heat insulator having a through-hole area according to the second invention. FIGS. 4(A) and (B) are respectively schematic planar and sectional views illustrating the vacuum heat insulator having a notched area according to the second invention. FIGS. 6(A) and (B) are respectively schematic planar and sectional views illustrating the vacuum heat insulator having multiple core members according to the second invention.

A fiber aggregate is processed into sheet, for example, by a needle-punching method, to give a core member. The core member obtained is cut into pieces of a suitable size and shape (for example, square), and a through-hole is formed in the core member for a through-hole product, and a notch for a notched product. Both a through-hole and a notch may be formed. The core member is then dried for removal of moisture and others contained therein. Similarly to the first invention, it may be dried in combination with far-infrared ray or under vacuum, and the drying condition is the same as that for the core member in the first invention.

Then, the core member (1, 11, or 21) is placed in an external packaging member (2, 12, or 22) with its peripheral edge areas (3A to 3C, 13A to 13C, or 23A to 23C) sealed in the three directions. Multiple core members 21 are placed therein when needed. A gas-adsorbing member is added additionally if needed. The external packaging member containing all of them is placed in a vacuum apparatus in that state, and the apparatus is evacuated to an internal pressure of approximately 0.1 to 0.01 Torr. The opening of the bag, unsealed region of the peripheral edge area of external packaging member, is then sealed by thermal fusion. The peripheral edge area of external packaging member (3D, 13D, or 23D) is sealed for preservation of the reduced pressure after evacuation, and the width, position, and others of sealing are adjusted properly in the range allowing preservation of reduced pressure. For example, when the thickness of the core member after evacuation is approximately 0.5 to 15 mm, the seal width is preferably approximately 5 to 30 mm. Formation of a sealed region at the terminal of the external packaging member with some margin region for facilitating sealing is effective in preventing nonconformity in sealing and improving workability. The margin region may be used as it is bent during use or may be removed.

In producing the through-hole or notched product, the rear faces of the external packaging member are sealed to each other by heat press or the like, along the internal peripheral area (3E or 13E) of the through-hole area 3F and/or notched area 13F or over the entire surface (3G or 13G) of the internal peripheral area or the through-hole area 3F and/or notched area 13F. When multiple core members are placed, the rear faces of the external packaging member are sealed to each other, for example, by heat sealing along the peripheral area 23E of each core member. Then, in the case of a through-hole or notch product, a vacuum heat insulator having a through-hole area 3F or a notched area 13F is formed by cutting the external packaging member, for example, with a cutter while leaving the sealed internal peripheral areas (3E or 13E) as they are. The internal peripheral area (3E or 13E) is left to the degree allowing preservation of the reduced pressure after evacuation, and the width and others of the sealed internal peripheral area are adjusted properly in the range allowing preservation of the reduced pressure state. The vacuum heat insulator after preparation may be pressed as needed for adjustment of the thickness of the core member and also for control of the density.

The vacuum heat insulator according to the second invention may be produced by a method including the following steps:

(a) a step of placing a core member in an external packaging member bag;

(b) a step of sealing the opening of the external packaging member bag by contact with a heated unit under pressure while the external packaging member bag is kept under vacuum; and (c) a step of forming a sealed region in the area inside the peripheral edge area of external packaging member by heating the opening-sealed external packaging member containing the core member.

Hereinafter, each step will be described in detail.

Step (a);

In the present step a core member is placed in an external packaging member bag through its opening.

Figure 3:
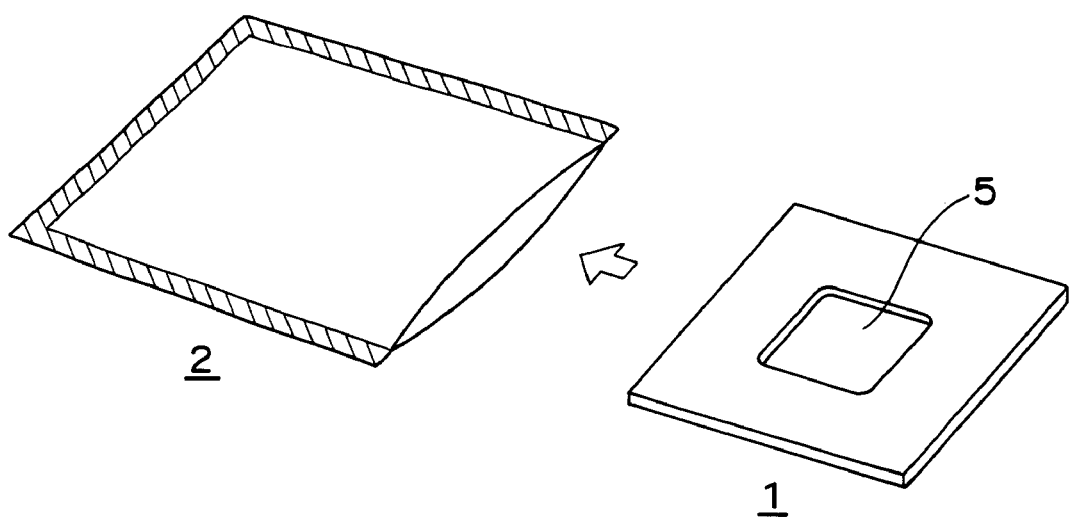
FIGS. 3(A) and 3(B) are jointly a schematic flowchart showing part of the procedure for producing the vacuum heat insulator shown in FIG. 2.
Figure 3:
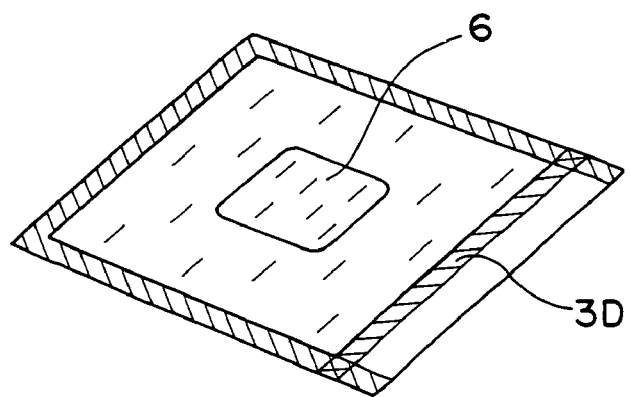

For example, in producing a vacuum heat insulator having the through-hole area 3F shown in FIG. 2, as shown in FIG. 3(A), a core member 1 having a through-hole area 5 is used and placed in the external packaging member bag 2 through the opening.

Figure 5:
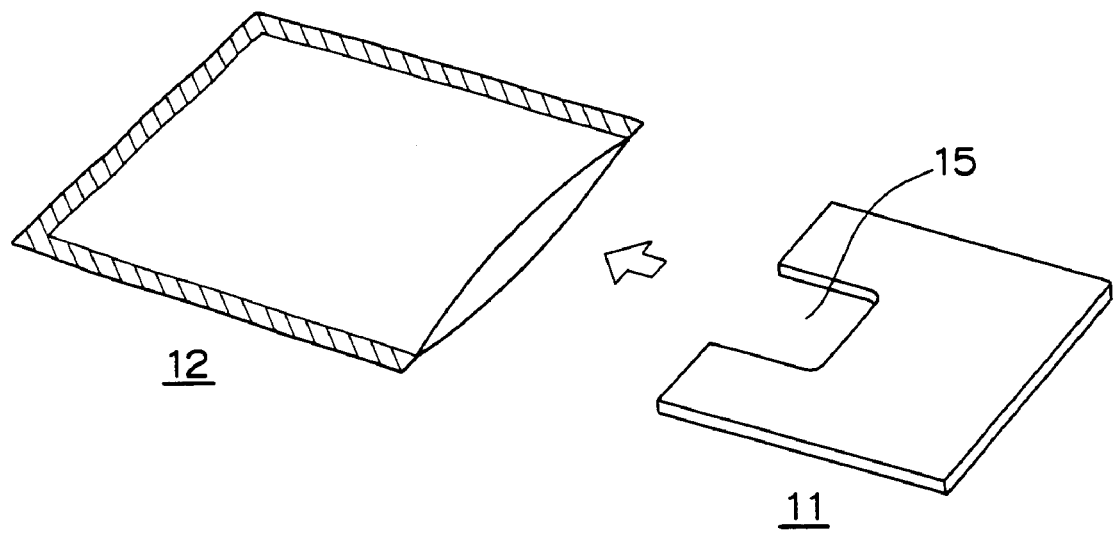
FIGS. 5(A) and (B) are jointly a schematic flowchart showing part of the procedure for producing the vacuum heat insulator shown in FIG. 4.
Figure 5:
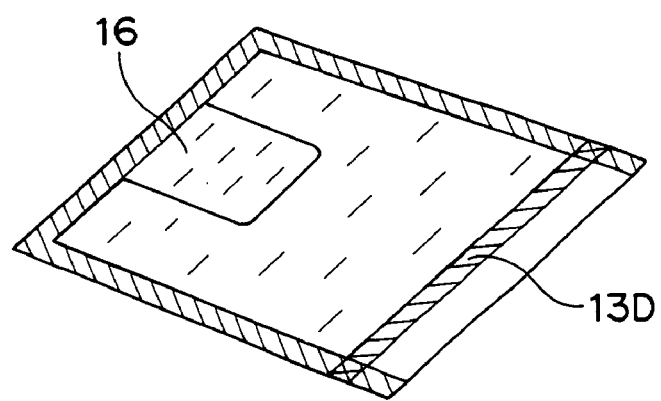

Alternatively, for example, in preparing a vacuum heat insulator having the notched area (entire region hatched with dotted lines) shown in FIG. 4, as shown in FIG. 5(A), a core member 11 having a notched area 15 is used and placed in the external packaging member bag 12 through the opening.

Figure 7:
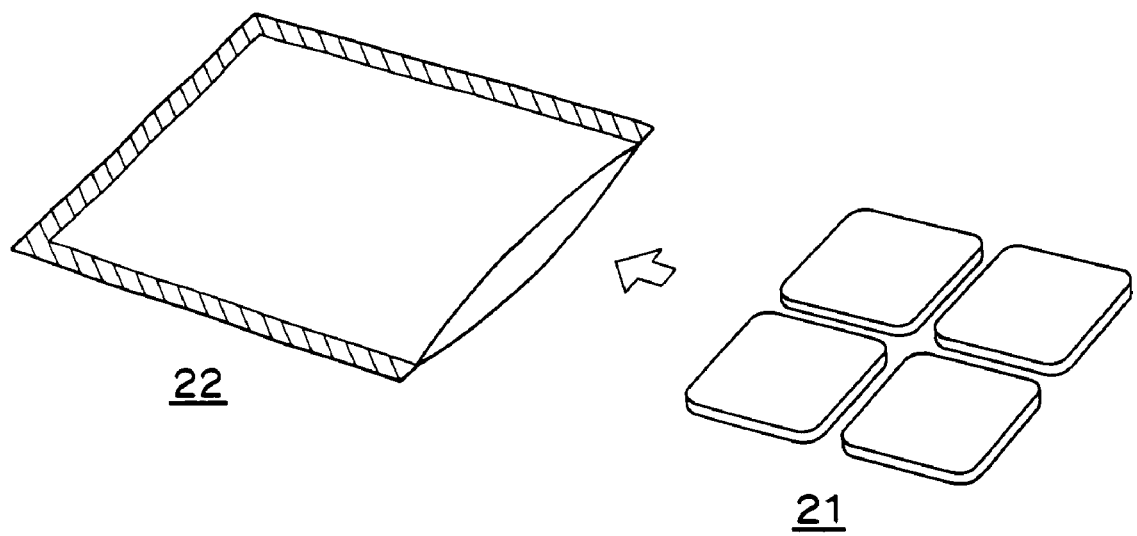
FIGS. 7(A) and (B) are jointly a schematic flowchart showing part of the procedure for producing the vacuum heat insulator shown in FIG. 6.
Figure 7:
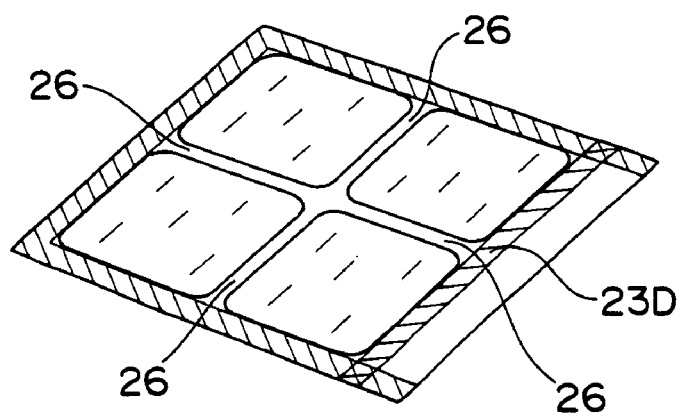

Yet alternatively, for example, in preparing a vacuum heat insulator having the bending groove 23E shown in FIG. 6, as shown in FIG. 7(A), two or more divided core members 21 are used and placed in parallel in the external packaging member bag 22 through the opening.

In the present step the core member is preferably dried. Similarly to the first invention, it may be dried in combination with far-infrared ray or under vacuum, and the drying condition is the same as that for the core member in the first invention.

Step (b);

In the present step, the opening of the external packaging member bag is sealed by contact of a heated unit under pressure, while the external packaging member bag storing a core member is evacuated inside, forming an absorption region between the rear faces of external packaging member in the area inside the external packaging member peripheral edge area, and thus, giving, for example, a vacuum heat insulator shown in FIG. 3(B), 5(B) or 7(B).

Specifically in FIG. 3(B), in the region 6 corresponding to the through-hole area of core member, the rear faces of the external packaging member are physically adsorbed on each other under reduced pressure, and the adsorption region 6 gives a sealed region after fusion in the step (c) below.

In FIG. 5(B), in the region 16 corresponding to the notched area of core member, the rear faces of the external packaging member are physically adsorbed on each other under reduced pressure and the adsorption region 16 give a sealed region by fusion later in the step (c).

In FIG. 7(B), in the region 26 between core members, the rear faces of the external packaging member are physically adsorbed on each other under reduced pressure, and the adsorption region 26 gives a sealed region by fusion later in the step (c).

The internal pressure in the external packaging member when the opening is sealed is not particularly limited, if the adsorption region can be fused by heating later in the step (c), but normally, preferably 0.05 Torr or less, particularly preferably 0.01 to 0.005 Torr. An excessively larger internal pressure prohibits sufficient adsorption of the rear faces of the external packaging member and thus, formation of the sealed region even when heated in the later step (c).

The heating unit for sealing the opening is not particularly limited, if it can seal the opening, and examples thereof include heating block, jigs using ultrasonic vibration, jigs using high-frequency electric field, and the like.

The temperature, pressure, and contact period of the heating unit are is not particularly limited, if the opening is sealed.

Step (c);

In the present step, the opening-sealed external packaging member containing a core member is simply heated. The rear faces of the external packaging member formed in the previous step (b) in the region where they are adsorbed on each other fuse to each other simply by heating, giving a sealed region.

For example in FIG. 3(B), the adsorption region 6 fuses in the through-hole area of the core member, giving a sealed region. The sealed region formed in this step is shown as region 3G in FIG. 2(A).

For example in FIG. 5(B), the adsorption region 16 fuses, giving a sealed region, in the notched area of core member. The sealed region formed in the present step is shown as region 13G in FIG. 4(A).

For example in FIG. 7(B), the adsorption region 26 forms a sealed region between core members. The sealed region formed in the present step is shown as region 23E in FIG. 6(A).

The heating means is not particularly limited, if it can raise the temperature to a particular temperature, and an oven, hot air dryer, or the like is normally used. The heating temperature and time is not particularly limited, if the rear faces of the external packaging member are fused to each other in the adsorption region. The heating temperature is, for example, not lower than the melting point of the seal layer (the innermost layer in external packaging member). Preferably, it is a temperature higher by 5° C. or more than the melting point of the seal layer. The heating time is favorably, for example, 1 to 120 seconds, particularly favorably 10 to 60 seconds.

When a vacuum heat insulator having a through-hole area and/or a notched area is prepared, the method additionally includes the following step (d):

Step (d);

In the present step, the sealed region of core member in the through-hole area and/or the notched area (region hatched with dotted lines in FIG. 2(A) or 4(A)) is cut, while leaving sealed region (3E in FIG. 2(A), or 13E in FIG. 4(A)) at the periphery, forming a through-hole area and/or a notched area in the vacuum heat insulator.

As described above, formation of a sealed region (3G, 13G or 23E) in the area inside the external packaging member peripheral edge area simply by heating, in particular by oven heating, after sealing the opening of the external packaging member under vacuum in preparing the vacuum heat insulator according to the second invention gives the following advantageous effects. It is possible to produce the vacuum heat insulator easily, because contact of the heating unit only once under pressure is enough for sealing the opening, and there is no need for processing the heating unit for pressure welding into a complicated shape. Even when the sealed region formed in the region inside the peripheral edge area in the vacuum heat insulator is more complicated in shape, it is also possible to prepare the vacuum heat insulator easily and simply, because the sealed region is formed simply by heating.

Third Invention

The vacuum heat insulator according to the third invention is a vacuum heat insulator according to the first invention, wherein an internal packaging member containing a core member is placed in the external packaging member under reduced pressure. Thus, unless otherwise indicated, the vacuum heat insulator according to the third invention is the same as the vacuum heat insulator according to the first invention, except that the core member is contained in an internal packaging member. Hereinafter, the third invention will be described, but description of the elements same as those in the first invention is omitted.

Specifically, the vacuum heat insulator according to the third invention has at least a core member, an internal packaging member that contains the core member, and an external packaging member that can contain the internal packaging member and keep inside under reduced pressure.

In the third invention, the core member is preferably a material similar to the core member of the first invention.

The shape of the fiber aggregate as a core member in the third invention is not particularly limited, and may be, for example, sheet or fiber floc. The shape of sheet allows improvement in the handleability and workability of core member, reduction of environmental load during production and recycling, and improvement in heat-insulating properties of vacuum heat insulator. It is possible to achieve the object of the third invention by using a floc shaped fiber. Use of a fiber floc aggregate prohibited preservation of reduced pressure in the external packaging member because of scratch on the external packaging member and adhesion of the core member to the opening of the external packaging member, and resulted in decrease in the yield of vacuum heat insulat and/or significant deterioration in heat-insulating properties because of disproportionation of the core member, but, in the third invention, it is possible to prevent such problems effectively, even when such a fiber floc core member is used.

The "fiber floc" is a state of so-called raw cotton, wherein individual fibers are entangled irregularly with each other and integrated. Sheet-shaped aggregates, such as so-called web, combed raw cotton, and needle-punched web, are not included.

The internal packaging member is not particularly limited, if it can contain the core member, and preferably in the shape allowing air permeation. Examples of such materials include films having permeable pores at least partially, and woven fabrics, knitted fabrics, nonwoven fabrics, and the like. The width of the pore in the film and the weight per unit area of the woven fabric, knitted fabric or nonwoven fabric are not particularly limited, if the core member does not scatter from the internal packaging member when evacuated and the internal packaging member is also evacuated smoothly inside during production of the vacuum heat insulator. In the third invention, a non-air-permeable film may also be used as the internal packaging member. By using a non-air-permeable internal packaging member, it is possible to keep inside the internal packaging member under reduced pressure only with the internal packaging member.

The material for the internal packaging member is not particularly limited, if the object of the third invention is achieved, and examples thereof include polyester, polypropylene, nylon and the like. It is preferably polyester from the viewpoint of out-gas generation, and it is most preferable to use PET both as a core member and an internal packaging member from the viewpoint of recycling property. In addition, use of a material having a melting point of 100° C. or higher, in particular approximately 100 to 300° C., is preferable from the viewpoint of the drying efficiency of core member during production of the vacuum heat insulator. For example, the woven fabric, knitted fabric or nonwoven fabric of polyester for the internal packaging member may be made of a polyester similar to the polyester fiber used as the core member in the first invention.

It is preferable that a gas-adsorbing member is placed in the vacuum heat insulator according to the third invention, similarly to the first invention, for more improvement of the heat-insulating properties with time. In the third invention, the gas-adsorbing member is placed between the external packaging member and the internal packaging member or in the internal packaging member. Preferably, the gas-adsorbing member may be placed directly in a dent suitable in size to the gas-adsorbing member formed on the core member inside the internal packaging member or indirectly over an internal packaging member at the location of the dent. The gas-adsorbing member may be contained in a hard container having permeable pores. Alternatively, it may be placed in an air-permeable soft container (for example, bag of nonwoven fabric).

A favorable embodiment of the method of producing the vacuum heat insulator according to the third invention will be described below. A core member in a particular shape is placed in an air-permeable internal packaging member. A gas-adsorbing member may be placed then with the core member in the internal packaging member. When the core member is sheet-shaped, two or more core members may be placed piled in the internal packaging member. The bag-shaped internal packaging member preferably has an opening, and, an example thereof is a laminate of two square internal packaging members bound to each other in three directions. The bonding method depends on the material for the internal packaging member used, and the internal packaging members may be bound to each other, for example, by thermal fusion or by sewing.

Then, the opening of the internal packaging member containing the core member is sealed. The opening is preferably sealed then, for example, with a jig such as pressing machine, while the thickness of the particular core member is properly preserved. Pressing leads to improvement in the surface smoothness of the vacuum heat insulat and/or workability, for example, during attachment thereof to the internal surface of a refrigerator case, and additionally, to further improvement in heat-insulating properties. It is also preferable to apply not only pressure but also heat during pressing. Because combined application of heat and pressure increases the surface smoothness of the vacuum heat insulator further and assures superior heat-insulating properties easily. Especially when a fiber floc fiber aggregate is used for the core member, it is more preferable to apply heat during pressing. The pressing temperature is preferably 30 to 100° C., particularly preferably 35 to 85° C.

The opening of the internal packaging member may be sealed by thermal fusion or by sewing.

After a core member is placed in the internal packaging member and the opening thereof is sealed, the internal packaging member obtained is placed in a bag-shaped external packaging member previously fused thermally in three directions. A gas-adsorbing member may be placed together then. Two or more internal packaging members containing a core member may be placed piles in the external packaging member.

The external packaging member containing the internal packaging member is transferred into a vacuum apparatus while the opening is left open, and the apparatus is evacuated to an internal pressure of approximately 0.1 to 0.01 Torr. The opening of the external packaging member is the sealed by thermal fusion, to give a vacuum heat insulator.

The vacuum heat insulator may be pressed at room temperature, for adjustment of the thickness and the density of the core member.

For further improvement in heat-insulating properties, the core member is preferably dried before the opening of the external packaging member is sealed. Specifically, the core member may be dried immediately before the internal packaging member with sealed opening containing a core member is placed in the external packaging member or after it is placed in the external packaging member and before evacuation. Similarly to the first invention, it may be dried in combination with far-infrared ray or under vacuum, and the drying condition is the same as that for the core member in the first invention.

When a non-air-permeable internal packaging member is used, the core member is placed in a vacuum apparatus as enclosed in a bag-shaped internal packaging member, and the vacuum apparatus is evacuated to an internal pressure of approximately 0.1 to 0.01 Torr, and then, the opening of the internal packaging member is sealed by thermal fusion. Preferably, a particular thickness of the core member above is preserved with a jig such as pressing machine during evacuation. In this way, it is possible to obtain the internal packaging member containing a core member under reduced pressure. The bag-shaped internal packaging member in such a case is not particularly limited, if it has an opening and can keep inside under reduced pressure when the opening is sealed under reduced pressure, and, for example, is a composite of two piled square internal packaging members thermally bonded in three directions. In such a case, the core member is favorably dried before evacuation of the opening-unsealed internal packaging member containing the core member. The internal packaging member containing a core member sealed under reduced pressure state thus obtained is placed in the external packaging member and the opening of the external packaging member is sealed under reduced pressure, similarly to the air-permeable internal packaging member.

EXAMPLES

Example A

Fiber for Use as Core Member

The polyester fibers shown in Table 1 were used. The polyester fibers were polyethylene terephthalate fibers having a fiber length of 51 mm.

Example A1

The polyester fiber shown in Table 1 was processed into sheet by a needle-punching method. The weight per unit area of the sheet immediately after processing was 550 g/m². The sheet was cut into pieces of 200 mm×200 mm in size and dried at the temperature of 120° C. for 1 hour. After drying, four sheets were laminated, and the laminate was placed as a core member in an external packaging member of a gas barrier film having a four-layer structure of nylon, aluminum-deposited PET, aluminum foil, and high-density polyethylene, together with a gas-adsorbing member (COMBO, manufactured by Saes Getters Japan Co., Ltd). Then, the external packaging member was sealed by thermal fusion in a vacuum apparatus evacuated to an internal pressure of 0.01 Torr. The vacuum heat insulator obtained was 200 mm×200 mm in size and 10 mm in thickness. The density of the core member in the vacuum heat insulator obtained was 220 kg/m³.

<Production Method in Examples A2 to A8 and Comparative Examples A1 to A2>

Vacuum heat insulators were prepared by a method similar to that in Example A1, except that the kind and amount of the fiber used as a core member were changed as shown in Table 1. In Comparative Example A2, a fiber floc was used as it is without processing into sheet.

Comparative Example A3

An open-cell polyurethane foam was first cut into pieces of 200 mm×200 mm×10 mm in size. The core member was dried at the temperature of 120° C. for 1 hour. After drying, the core member was placed in an external packaging member similar to that in Example A1, together with a gas-adsorbing member. Then, the external packaging member was sealed by thermal fusion in a vacuum apparatus evacuated to an internal pressure of 0.01 Torr, to give a vacuum heat insulator.

<Initial Heat-Insulating Properties>

The initial heat-insulating properties were evaluated by measuring heat conductivity at the average temperature of 20° C. by using "AutoλHC-074" (manufactured by EKO Instruments Co., Ltd.). The heat conductivity was determined one day after the evacuation step.

<Long-Term Heat-Insulating Properties>

The long-term heat-insulating properties were evaluated by placing a vacuum heat insulator used for evaluation of the initial heat-insulating properties in a thermostatic oven at 70° C. for four weeks and then, measuring heat conductivity thereof at the average temperature of 20° C. by using "AutoλHC-074" (manufactured by EKO Instruments Co., Ltd.).

<Workability>

The workability in placing a fiber aggregate in external packaging member was evaluated according to the following criteria:

◯: The fiber aggregate was placed easily in the external packaging member; and x: The core member was brittle and the fiber aggregate could not be placed uniformly in the external packaging member.

TABLE 1

| | Example | | | | | | | | Comparative Example | | |
|---|---|---|---|---|---|---|---|---|---|---|---|
| | A1 | A2 | A3 | A4 | A5 | A6 | A7 | A8 | A1 | A2 | A3 |
| Sheet-forming method* | NP | NP | NP | NP | NP | NP | NP | NP | NP | Without processing (fiber floc) | Without processing |
| Kind of fiber** (wt %) | PES (100) | PES (100) | PES (100) | PES (100) | PES (100) | PES (100) | PES (100) | PES (100) | PES (100) | PES (100) | PU (100) |
| Average fiber denir (d) | 1.5 | 1.5 | 1.5 | 1.5 | 1.5 | 3 | 3 | 6 | 9 | 1.5 | — |
| Average fiber diameter (μm) | 11 | 11 | 11 | 11 | 11 | 17 | 17 | 25 | 30 | 11 | — |
| Core member density under vacuum (Kg/m³) | 220 | 250 | 180 | 260 | 300 | 280 | 300 | 300 | 300 | 250 | 60 |
| Initial heat conductivity (W/m · K) | 0.0031 | 0.0032 | 0.0034 | 0.0033 | 0.0037 | 0.0039 | 0.0038 | 0.0043 | 0.0050 | 0.0110 | 0.0060 |
| Long-term heat conductivity (W/m · K) | 0.0036 | 0.0038 | 0.0042 | 0.0040 | 0.0042 | 0.0048 | 0.0048 | 0.0051 | 0.0068 | 0.0142 | 0.0062 |
| Workability | ◯ | ◯ | ◯ | ◯ | ◯ | ◯ | ◯ | ◯ | ◯ | X | ◯ |

*NP: needle-punching method
**PES: polyester fiber, PU: polyurethane foam

Example B

Preparation of Gas-Adsorbing Member

Gas-Adsorbing Member A

Two sheets of PET nonwoven fabric having a weight per unit area of 50 g/m² (dimension: 50 mm×100 mm) of a polyethylene terephthalate fiber having an average fiber size of 1.5 denier and an average fiber length of 51 mm were layered and sealed in three directions. Ten g of a gas-adsorbing substance was placed therein, and the opening was sealed, to give a gas-adsorbing member A.

Gas-Adsorbing Member B

A gas-adsorbing member B was prepared by a method similar to that for the gas-adsorbing member A, except that a PET nonwoven fabric having a weight per unit area of 60 g/m² was used.

Gas-Adsorbing Member C

A gas-adsorbing member C was prepared by a method similar to that for the gas-adsorbing member A, except that a PET nonwoven fabric having a weight per unit area of 150 g/m² was used.

Gas-Adsorbing Member D

Two sheets of a PP nonwoven fabric having a weight per unit area of 60 g/m² (dimension: 50 mm×100 mm) of a polypropylene fiber having an average fiber size of 0.5 denier and an average fiber length of 51 mm were layered and sealed in three directions. Ten g of a gas-adsorbing substance was placed therein, and the opening was sealed, to give a gas-adsorbing member D.

Example B1

The fiber shown in Table 2 was processed into sheet by a needle-punching method. The diameter of the PET fiber was 1.5 deniers. The sheet was cut into pieces of 500 mm×500 mm in size and dried at the temperature of 120° C. for 1 hour. After drying, the sheet was placed as a core member in an external packaging member of a gas barrier film in a four-layer structure of nylon, aluminum-deposited PET, aluminum foil, and high-density polyethylene, together with a gas-adsorbing member A. Then, the external packaging member was sealed by thermal fusion in a vacuum apparatus evacuated to an internal pressure of 0.01 Torr. The vacuum heat insulator obtained was 500 mm×500 mm in size and 1 mm in thickness. The density of the core member in the vacuum heat insulator obtained was 220 kg/m³.

Examples B2 to B5

Comparative Example B1 and Reference Example B1

Vacuum heat insulators were prepared in a similar manner to Example B1, except that the kind, diameter of the fiber sued as a core member and the kind or the gas-adsorbing member were changed to those shown in Table 2.

<Heat-Insulating Properties>

The heat-insulating properties were evaluated by a method similar to that used for evaluation of the initial heat-insulating properties in Example A.

<Curved-Surface Processability>

The vacuum heat insulator obtained was wound around a tubular plastic pipe having a diameter of 150 mm and a length of 600 mm. The easiness of winding the vacuum heat insulat and/or the adhesiveness thereof to the pipe were evaluated.

⊚: Easy winding and good adhesiveness;
◯: Less easy winding but good adhesiveness; and
x: Difficult winding and worse adhesiveness.

TABLE 2

|  |  | Example | | | | | Comparative Example | Reference Example |
|---|---|---|---|---|---|---|---|---|
|  |  | B1 | B2 | B3 | B4 | B5 | B1 | B1 |
| Core member | Kind of fiber* (wt %) | PET (100) | PET (100) | PET (100) | PET (100) | PET (100) | GW (100) | PET (100) |
|  | Average fiber diameter (μm) | 12 | 12 | 12 | 12 | 12 | 4 | 12 |
|  | Average fiber length (mm) | 51 | 51 | 51 | 51 | 51 | 10 | 51 |
|  | Core member density under vacuum (Kg/m³) | 220 | 220 | 220 | 220 | 220 | 220 | 220 |
|  | Core member thickness under vacuum (mm) | 1 | 2 | 3 | 3 | 3 | 3 | 10 |
| Gas-adsorbing member | Kind | A | A | B | D | C | A | A |
| Evaluation | Heat conductivity (W/m · K) | 0.010 | 0.006 | 0.004 | 0.004 | 0.004 | 0.004 | 0.003 |
|  | Curved-surface processability | ⊚ | ⊚ | ⊚ | ◯ | ◯ | X | X |

*PET: polyethylene terephthalate fiber, cotton: cotton fiber, GW: glass wool

Example C

Fiber for Use as Core Member

The following polyester fibers were used:

Polyester fiber A (in normal structure (PET), fiber size: 1.5 d, fiber length: 51 mm, and PET melting point: 260° C.); and Polyester fiber B (in core/shell structure (both core and shell regions: PET), fiber size: 2 d, fiber length: 51 mm, core-region PET melting point: 260° C. (PET), shell-region PET melting point: 120° C. (PET)).

Example C1

The fiber shown in Table 3 was processed into sheet by needle-punching and thermal-bonding methods according to the following method, and, specifically polyester fibers A 90% by weight and B 10% by weight were blended and processed preliminary into sheet by a needle-punching method and finally into a sheet-shaped core member by a thermal-bonding method at 120° C. The weight per unit area of the sheet immediately after processing was 550 g/m².

The sheet obtained was cut into pieces of 200 mm×200 mm in size and dried at the temperature of 105° C. for 1 hour. After drying, four sheets were laminated, and the laminate was placed as a core member in an external packaging member of a gas barrier film having a four-layer structure of nylon, aluminum-deposited PET, aluminum foil, and high-density polyethylene, together with a gas-adsorbing member (COMBO, manufactured by Saes Getters Japan Co., Ltd). Then, the external packaging member was sealed by thermal fusion in a vacuum apparatus evacuated to an internal pressure of 0.01 Torr. The vacuum heat insulator obtained was 200 mm×200 mm in size and 10 mm in thickness 10 mm. The density of the core member in the vacuum heat insulator obtained was 220 kg/m³.

Examples C2 to C3

Vacuum heat insulators were prepared in a manner similar to Example C1, except that the kinds and contents of the fibers used as a core member were changed to those shown in Table 3.

Reference Example C1

A vacuum heat insulator was prepared in a manner similar to Example C1, except that the fiber shown in Table 3 was processed into sheet only by a needle-punching method according to the following method. Specifically, the polyester fiber A was processed into a web by a needle-punching method. The weight per unit area of the sheet immediately after processing was 550 g/m².

Reference Example C2

A vacuum heat insulator was prepared in a manner similar to Example C1, except that the fiber shown in Table 3 was processed into sheet only without success and the fiber aggregate melted into an undefined shape.

Comparative Example C1

A vacuum heat insulator was prepared in a manner similar to Example C1, except that 88 g of fiber floc of the fiber shown in Table 3 was used as it is as a core member without processing into sheet.

<Initial Heat-Insulating Properties>

The initial heat-insulating properties was evaluated by a method similar to that used for evaluation of the initial heat-insulating properties in Example A.

<Workability>

The workability in placing a core member (fiber aggregate) in external packaging member was evaluated according to the following criteria:

⊚: The core member was placed very easily in the external packaging member;

○: The core member was placed easily, although slightly less efficiently than in ⊚, in the external packaging member;

x: The core member was brittle, and the fiber aggregate could not be placed uniformly in the external packaging member.

TABLE 3

|  | Example | | | | | | Reference Example | | Comparative Example |
|---|---|---|---|---|---|---|---|---|---|
|  | C1 | | C2 | | C3 | | C1 | C2 | C1 |
| Sheet-forming method* | NP→SB | | NP→SB | | NP→SB | | NP | NP→SB | Without processing (fiber floc) |
| Heating temperature during thermal bonding (° C.) | 120 | | 120 | | 120 | | — | 120 | — |
| Kind of fiber** | PES-A | PES-B | PES-A | PES-B | PES-A | PES-B | PES-A | PES-B | PES-A |
| (wt %) | (90) | (10) | (85) | (15) | (50) | (50) | (100) | (100) | (100) |
| Fiber structure | Normal | Core/shell | Normal | Core/shell | Normal | Core/shell | Normal | Core/shell | Normal |
| Melting point of constituent polymers (° C.) | 260 | Core; 120 Shell; 260 | 260 | Core; 120 Shell; 260 | 260 | Core; 120 Shell; 260 | 260 | Core; 120 Shell; 260 | 260 |
| Fiber size (d) | 1.5 | 2 | 1.5 | 2 | 1.5 | 2 | 1.5 | 2 | 1.5 |
| Average fiber diameter (μm) | 11 | 13 | 11 | 13 | 11 | 13 | 11 | 13 | 11 |
| Density of core member under vacuum (Kg/m³) | 280 | | 300 | | 315 | | 300 | Not processed into sheet | 250 |
| Initial heat conductivity (W/m · K) | 0.0042 | | 0.0046 | | 0.0049 | | 0.0038 | | 0.0110 |
| Workability | ⊚ | | ⊚ | | ⊚ | | ○ | | X |

*NP: needle-punching method, SB: thermal-bonding method

**PES-A: polyester fiber A, PES-B: polyester fiber B

Example D

Example D1

A polyester fiber (polyethylene terephthalate fiber) having fiber size of 1.5 denier, average fiber diameter of 12 μm and a fiber length of 51 mm was used as a core member. The polyester fiber was processed into sheet by a needle-punching method. The weight per unit area of the sheet immediately after processing was 660 g/m$^2$. The sheet was cut into pieces of 200 mm×200 mm in size. A fiber region of 100 mm×100 mm in the central area of the sheet was cut off, leaving a through-hole of the same size. The sheet having a through-hole was dried at the temperature of 110° C. for 1 hour. The sheet was placed in an external packaging member of a gas barrier film having a four-layer structure of nylon, aluminum-deposited PET, aluminum foil, and high-density polyethylene. Then, the unsealed region in the peripheral edge area of external packaging member, i.e., bag opening region, was sealed by thermal fusion in a vacuum apparatus evacuated to an internal pressure of 0.01 Torr. The evacuation period was 180 seconds. The vacuum heat insulator obtained was 200 mm×200 mm in size and 3 mm in thickness. The rear faces of the external packaging member were sealed, while the through-hole region of 100 mm×100 mm was heat-pressed. Then, the through-hole region, a central region of 70 mm×70 mm, was cut off, giving a vacuum heat insulator having a sealed region of 15 mm in width along the internal peripheral area of the through-hole area. The vacuum heat insulator had a through-hole area, did not have any fracture of the external packaging member in the region along the inner periphery of the through-hole area, and showed superior adhesiveness between the core member and the external packaging member. The density of the core member under vacuum was 220 kg/m$^3$.

Example D2

A polyester similar to polyester fiber used in Example D1 was used as a core member. The polyester fiber was processed into sheet by a needle-punching method. The weight per unit area of the sheet immediately after processing was 660 g/m$^2$. The sheet was cut into pieces of 200 mm×200 mm in size. A fiber region of 100 mm×100 mm in the terminal region of the sheet was cut off, to leave a notch of the size. The sheet having a notch was dried at the temperature of 110° C. for 1 hour. The sheet was placed in an external packaging member of a gas barrier film having a four-layer structure of nylon, aluminum-deposited PET, aluminum foil, and high-density polyethylene. Then, the unsealed region in the peripheral edge area of external packaging member, i.e., bag opening region, was sealed by thermal fusion in a vacuum apparatus evacuated to an internal pressure of 0.01 Torr. The evacuation period was 180 seconds. The vacuum heat insulator obtained was 200 mm×200 mm in size and 3 mm in thickness. The rear faces of the external packaging member were sealed, while the notch region of 100 mm×100 mm was heat-pressed. Then, the notch region, a region of 60 mm×60 mm, was cut off, giving a vacuum heat insulator having sealed region of 20 mm in width formed along the inner periphery of the notch area. The vacuum heat insulator has a notch area, did not have fracture of the external packaging member in the notch internal peripheral region, and showed superior adhesiveness between the core member and the external packaging member. The density of the core member under vacuum was 220 kg/m$^3$.

Example D3

A polyester similar to polyester fiber used in Example D1 was used as a core member. The polyester fiber was processed into sheet by a needle-punching method. The weight per unit area of the sheet immediately after processing was 660 g/m$^2$. The sheet was cut into pieces of 90 mm×90 mm in size. Four of the sheets were dried at a temperature 110° C. for 1 hour. The sheet was placed in an external packaging member of a gas barrier film having a four-layer structure of nylon, aluminum-deposited PET, aluminum foil, and high-density polyethylene. The four core members are placed at positions separated by a gap of 20 mm from each other in such a manner that the four core members occupy an area of 200 mm×200 mm. Then, the unsealed region in the peripheral edge area of external packaging member, i.e., bag opening region, was sealed by thermal fusion in a vacuum apparatus evacuated to an internal pressure of 0.01 Torr. The evacuation period was 180 seconds. The vacuum heat insulator obtained was 200 mm×200 mm in size and 3 mm in thickness. The rear faces of the external packaging member were sealed to each other, by fusion of the area along the external peripheries of respective core members of 20 mm×20 mm. The vacuum heat insulator contained an external packaging member containing four core members, did not have fracture of the external packaging member along the external periphery of each core member, and showed superior adhesiveness between the core member and the external packaging member. The density of the core member under vacuum was 220 kg/m$^3$.

Example E

Example E1

The vacuum heat insulator shown in FIGS. 2(A) and (B) was prepared according to the following method. The method will be described with reference to FIG. 3.

A polyester fiber (polyethylene terephthalate fiber) having a fiber diameter of 1.5 denier, average fiber diameter of 12 μm and a fiber length of 51 mm was used as a core member 1. The polyester fiber was processed into sheet by a needle-punching method. The weight per unit area of the sheet immediately after processing was 660 g/m$^2$. The sheet was cut into pieces of 200 mm×200 mm in size. As shown in FIG. 3(A), a region of 100 mm×100 mm in the central region of the sheet was cut off, leaving a through-hole 5 of the same size. The sheet 1 having the through-hole 5 was dried at the temperature of 110° C. for 1 hour. The sheet was placed in an external packaging member 2 of a gas barrier film having a four-layer structure of nylon, aluminum-deposited PET, aluminum foil, and high-density polyethylene, together with a gas-adsorbing member (not shown in the Figure). The melting point of the seal layer high-density polyethylene was 120° C. Then, the unsealed region in the peripheral edge area of external packaging member, i.e., bag opening region, was sealed by thermal fusion with a heating unit in a vacuum apparatus evacuated to an internal pressure of 0.01 Torr (forming sealed region 3D). FIG. 3(B) is a schematic view showing the state of the vacuum heat insulator. The thickness thereof under vacuum was 3 mm, and the evacuation period was 180 seconds. Then, the external packaging member after evacuation was heat-treated in a heating oven at 160° C. for 30 seconds, allowing fusion of the rear faces of the external packaging member in the sheet through-hole region represented by "6" in FIG. 3(B). After cooling, a central region of 70 mm×70 mm in the through-hole region was cut off (3F in FIG. 2), giving a vacuum heat insulator having a sealed region of 15 mm in width (3E in FIG. 2) formed along the inner periphery of the through-hole area in the vacuum heat insulator. The density of the core member under vacuum was 220 kg/m³.

The method of producing a vacuum heat insulator described above is superior in productivity, because it does not demand a heat pressing step of bonding the rear faces of the external packaging member in the sheet through-hole region (6 in FIG. 3(B)) to each other by contact of a heating unit under pressure after evacuation.

Example E2

The vacuum heat insulator shown in FIGS. 4(A) and (B) was prepared according to the following method. The method will be described with reference to FIG. 5.

A polyester fiber similar to that used in Example E1 was used as a core member 11. The polyester fiber was processed into sheet by a needle-punching method. The weight per unit area of the sheet immediately after processing was 550 g/m². The sheet was cut into pieces of 200 mm×200 mm in size. As shown in FIG. 5(A), a fiber region of 100 mm×100 mm in the sheet terminal area was cut off, leaving a notch 15 of the same the size. The sheet 11 having the notch 15 was dried at the temperature of 110° C. for 1 hour. The sheet was placed in an external packaging member 12 of a gas barrier film having a four-layer structure of nylon, aluminum-deposited PET, aluminum foil, and high-density polyethylene, together with a gas-adsorbing member (not shown in the Figure). The melting point of the seal layer high-density polyethylene was 120° C. Then, the unsealed region in the peripheral edge area of external packaging member, i.e., bag opening region, was sealed by thermal fusion with a heating unit in a vacuum apparatus evacuated to an internal pressure of 0.01 Torr (forming sealed region 13D). FIG. 5(B) is a schematic view showing the state of the vacuum heat insulator. The thickness under vacuum was 2.5 mm, and the evacuation period was 180 seconds. Then, the external packaging member after evacuation was heat-treated in a heating oven at 160° C. for 30 seconds, allowing fusion of the rear faces of the external packaging member in the sheet notch region represented by "16" in FIG. 5(B). After cooling, a central region of 60 mm×60 mm in the notch region was cut off (region hatched with dotted lines in FIG. 4F), giving a vacuum heat insulator having a sealed region of 20 mm in width (13E in FIG. 4) formed along the inner periphery of the notch area in the vacuum heat insulator. The density of the core member under vacuum was 220 kg/m³.

The method of producing a vacuum heat insulator described above is superior in productivity, because it does not demand a heat pressing step of bonding the rear faces of the external packaging member in the sheet notch region (16 in FIG. 5(B)) to each other by contact of a heating unit under pressure after evacuation.

Example E3

The vacuum heat insulator shown in FIGS. 6(A) and (B) was prepared according to the following method. The method will be described with reference to FIG. 7.

A polyester fiber similar to that used in Example E1 was used as a core member 21. The polyester fiber was processed into sheet by a needle-punching method. The weight per unit area of the sheet immediately after processing was 660 g/m². The sheet was cut into pieces of 90 mm×90 mm in size. Four of the sheets were dried at the temperature of 120° C. and a vacuum of 0.1 Torr. As shown in FIG. 7(A), the sheet 21 was placed in an external packaging member 22 of a gas barrier film having a four-layer structure of nylon, aluminum-deposited PET, aluminum foil, and high-density polyethylene. The melting point of the seal layer high-density polyethylene was 120° C. The four core members are placed at positions separated by a gap of 20 mm from each other in such a manner that the four core members occupy an area of 200 mm×200 mm. Then, the unsealed region in the peripheral edge area of external packaging member, i.e., bag opening region, was sealed by thermal fusion with a heating unit in a vacuum apparatus evacuated to an internal pressure of 0.01 Torr (forming sealed region 23D). FIG. 7(B) is a schematic view showing the state of the vacuum heat insulator. The thickness thereof under vacuum was 3 mm, and the evacuation period was 180 seconds. Then, the external packaging member after evacuation was heat-treated in a heating oven at 160° C. for 30 seconds, allowing fusion of the rear faces of the external packaging member in the core member external periphery region represented by "26" in FIG. 7(B), to give a vacuum heat insulator containing multiple core members. The density of the core member after vacuum was 220 kg/m³.

The method of producing a vacuum heat insulator described above is superior in productivity, because it does not demand a heat pressing step of bonding the rear faces of the external packaging member in the core member periphery region (26 in FIG. 7(B)) to each other by contact of a heating unit under pressure after evacuation.

Comparative Example E1

A vacuum heat insulator was prepared in a similar manner to Example E1, except that the bag opening region was sealed by heat treatment in a heating oven and subsequent treatment under reduced pressure, instead of sealing under reduced pressure and subsequent heat treatment. It was not possible to fuse the rear faces of external packaging member to each other in the sheet through-hole region represented by "16" in FIG. 3(B), and thus, to keep, inside the vacuum heat insulator, under reduced pressure after formation of the through-hole 3F.

Example F

Example F1

An air-permeable PET nonwoven fabric (PET fiber melting point: 260° C.) was cut into square pieces (250 mm×270 mm: including sealed region), and two of them were laminated and bonded in three directions by thermal fusion, to give an air-permeable bag-shaped internal packaging member. A fiber-floc core member (88 g) of a PET fiber (1.5 deniers, melting point: 260° C.) was filled in the bag-shaped internal packaging member. The internal packaging member containing the core member was pressed at a heating temperature of 40° C., sealing the opening by thermal fusion. The thickness of the core member when pressed was 10 mm. The top mold of the press had protuberances of 5 mm in height, which formed the dents for gas-adsorbing member by pressing.

An internal packaging member containing a core member and having the opening closed was dried at 120° C. for 60 minutes and then, placed in an external packaging member of a gas barrier film having a four-layer structure of nylon, aluminum-deposited PET, aluminum foil, and high-density polyethylene (250 mm×270 mm: including the sealed region), together with a gas-adsorbing member (COMBO-3, manufactured by Saes Getters Japan Co., Ltd) placed on the internal packaging member. The external packaging member placed immediately in a vacuum apparatus as it was and sealed by thermal fusion therein after evacuation to an internal pressure of 0.01 Torr. The vacuum heat insulator obtained had a core member of 200 mm×200 mm in size and 10 mm in thickness. The density of the core member in the vacuum heat insulator obtained was 220 kg/m$^3$.

Example F2

A sheet-shaped core member (88 g) of a web obtained by combing the PET fiber floc used in Example F1 was placed in a bag-shaped internal packaging member similar to that in Example F1. The opening of the internal packaging member containing a core member was sealed by thermal fusion, while pressed at a heating temperature of 40° C. The thickness of the core member during pressing was 10 mm. The internal packaging member containing a core member and having the opening closed was dried at 120° C. for 60 minutes, as it is placed in an external packaging member of a gas barrier film having a four-layer structure of nylon, aluminum-deposited PET, aluminum foil, and high-density polyethylene (250 mm×270 mm: including the sealed region). After drying, a gas-adsorbing member (COMBO-3, manufactured by Saes Getters Japan Co., Ltd) was placed on the internal packaging member in the external packaging member. The external packaging member was sealed by thermal fusion as it was in a vacuum apparatus evacuated to an internal pressure of 0.01 Torr. The core member in the vacuum insulator material obtained was 200 mm×200 mm in size and 10 mm in thickness. The density of the core member of the vacuum insulator material was 220 kg/m$^3$.

Example F3

A PET fiber (melting point: 260° C.) having fiber size of 1.5 deniers and average fiber diameter of 11 μm was processed into sheet by a needle punching method. The weight per unit area of the sheet was 550 g/m$^2$. The thickness of the sheet was 10 mm. The sheet was cut into pieces of 200 mm×200 mm, to give core members.

The core member obtained was placed in a bag-shaped internal packaging member, similarly to Example F1. The opening of the internal packaging member containing a core member was sealed by thermal fusion.

The internal packaging member containing a core member and having the opening closed was dried at 120° C. for 60 minutes, as it is placed in an external packaging member of a gas barrier film having a four-layer structure of nylon, aluminum-deposited PET, aluminum foil, and high-density polyethylene (250 mm×270 mm: including the sealed region). After drying, a gas-adsorbing member (COMBO-3, manufactured by Saes Getters Japan Co., Ltd) was placed on the internal packaging member in the external packaging member. The external packaging member was sealed by thermal fusion as it was in a vacuum apparatus evacuated to an internal pressure of 0.01 Torr. The core member in the vacuum insulator material obtained was 200 mm×200 mm in size and 10 mm in thickness. The density of the core member of the vacuum insulator material was 220 kg/m$^3$.

Example F4

A vacuum heat insulator was prepared in a similar manner to Example F1, except that 176 g of the fiber floc core member was filled in the bag-shaped internal packaging member uniformly and the core member thickness was 20 mm when pressed. The thickness of the vacuum heat insulator was approximately 20 mm, and the core member density, 220 kg/m$^3$.

Example F5

A vacuum heat insulator was prepared in a similar manner to Example F2, except that 264 g of a sheet-shaped core member consisting of three web layers was placed in the bag-shaped internal packaging member and the thickness of the core member was 30 mm when pressed. The thickness of the vacuum heat insulator was approximately 30 mm and the density of the core member density, 220 kg/m$^3$.

Example F6

A vacuum heat insulator was prepared in a similar manner to Example F3, except that a laminate of three core members obtained Example F3 was used as a core member. The thickness of the vacuum heat insulator was approximately 30 mm and the density of the core member density, 220 kg/m$^3$.

Comparative Example F1

A vacuum heat insulator was prepared in a similar manner to Example F1, except that the PET-fiber-floc core member was dried at 120° C. for 60 minutes and then placed directly in the external packaging member (250 mm×270 mm: including the sealed region). The density of the core member was 220 kg/m$^3$.

<Initial Heat-Insulating Properties>

The initial heat-insulating properties was evaluated by a method similar to that for the initial heat-insulating properties in Example A.

<Long-Term Heat-Insulating Properties>

The long-term heat-insulating properties was evaluated by a method similar to that for the long-term heat-insulating properties in Example A.

<Workability>

The workability in placing a core member or internal packaging member containing the core member in an external packaging member was evaluated according to the following criteria:

◯: Easy to place it in the external packaging member;

x: Difficult to place it in the external packaging member.

<Productivity>

The production procedure for the vacuum heat insulator in each Example or Comparative Example was repeated 50 times. The productivity was evaluated, based on the number (x) of the vacuum heat insulators that did not preserve the vacuum one day after production among 50 vacuum heat insulators obtained.

◯: 0 to 1;

x: 2 or more.

TABLE 4

| | Example | | | | | | Comparative Example |
|---|---|---|---|---|---|---|---|
| | F1 | F2 | F3 | F4 | F5 | F6 | F1 |
| Initial heat conductivity (W/m·K) | 0.0035 | 0.0033 | 0.0030 | 0.0035 | 0.0032 | 0.0031 | 0.0110 |
| Long-term heat conductivity (W/m·K) | 0.0039 | 0.0036 | 0.0035 | 0.0041 | 0.0037 | 0.0034 | 0.0142 |
| Workability | ○ | ○ | ○ | ○ | ○ | ○ | X |
| Productivity | ○ | ○ | ○ | ○ | ○ | ○ | X |

Example G

Example G1

Two sheets of a PET nonwoven fabric having a weight per unit area of 60 g/m$^2$ of a polyethylene terephthalate fiber were layered and sealed in three directions, a gas-adsorbing substance was placed therein, and the opening was sealed, to give a gas-adsorbing member. A polyester fiber (polyethylene terephthalate fiber) having fiber size of 1.5 denier, average fiber diameter of 12 μm and a fiber length of 51 mm was used as a core member. The polyester fiber was processed into sheet by a needle-punching method. The weight per unit area of the sheet immediately after processing was 550 g/m$^2$. The sheet was cut into pieces of 200 mm×200 mm in size and dried at the temperature of 120° C. and a vacuum of 0.1 Torr for 1 hour. After drying, four sheets were laminated, and the laminate was placed in an external packaging member of a gas barrier film having a four-layer structure of nylon, aluminum-deposited PET, aluminum foil, and high-density polyethylene. The gas-adsorbing member was placed on the core member, and placed together with the core member in the external packaging member. Then, the external packaging member was sealed by thermal fusion in a vacuum apparatus evacuated to an internal pressure of 0.01 Torr. The evacuation period was 180 seconds. The vacuum heat insulator obtained was 200 mm×200 mm in size and 10 mm in thickness. The density of the core member in the vacuum heat insulator obtained was 220 kg/m$^3$.

Example G2

A vacuum heat insulator was prepared in a similar manner to Example G1, except that a sheet-shaped packaging material made of a nonwoven fabric having a weight per unit area of 250 g/m$^2$ of polyester fiber (polyethylene terephthalate fiber) containing a chemical adsorption substance was used as the gas-adsorbing member. The period of evacuation was 250 seconds. The density of the core member under vacuum was 220 kg/m$^3$.

<Evaluation>

As for the vacuum heat insulator obtained in Example G1, it is possible to separate the adsorption substance from the core member easily after use, because the gas-adsorbing substance is placed in a sheet-shaped packaging material of polyester nonwoven fabric even in the external packaging member. In addition, there was no problem in surface state even when the vacuum heat insulator was bent. The method was also superior in productivity, because the absorbent was simply placed on the core member. The vacuum heat insulator of Example G2 had advantageous effects similar to those in Example G1.

INDUSTRIAL APPLICABILITY

The vacuum heat insulators according to the first, second and third inventions are applicable as a heat insulator to refrigerator, vending machine, cooling box, refrigerator truck, hot water tank, ice tank, hot-water supply tank, vacuum insulating piping, automobile molded head lining, bath tub, and many others.

In particular, the vacuum heat insulator according to the second invention is applicable to equipments having protrusions such as wiring or piping, for example, cylindrical tank of water supply facilities and cylindrical pipe of piping facilities, irregular-surfaced units such as refrigerator packages and cooling box package, as well as wiring and piping.

The invention claimed is:

1. A vacuum heat insulator, comprising at least a core member and an external packaging member that stores the core member, with the and can keep inside kept under reduced pressure, wherein the core member is a sheet-shaped fiber aggregate processed into a sheet by a needle-punching method, and containing a polyethylene terephthalate fiber, having a fiber size of 1 to 3 deniers and a diameter of 9 to 17 μm, in an amount of 100 wt %, and has a density of 100 to 450 kg/m$^3$.

2. The vacuum heat insulator according to claim 1, wherein the thickness of the core member under vacuum is 0.1 to 5 mm.

3. The vacuum heat insulator according to claim 2, further comprising a gas-adsorbing member containing a gas-adsorbing substance in a soft bag.

4. The vacuum heal insulator according to claim 3, wherein the bag of the gas adsorbing member comprises a nonwoven fabric of polyester fiber.

5. The vacuum heat insulator according to claim 3, wherein the bag of the gas adsorbing member is a nonwoven fabric made of polyethylene terephthalate fiber.

6. The vacuum heat insulator according to claim 4 or 5, wherein the weight per unit area of the nonwoven fabric is 30 to 200 g/m$^2$.

7. The vacuum heat insulator according to claim 1, wherein the core member is a sheet-shaped fiber aggregate containing at least two kinds of polyethylene terephthalate fibers having different melting points.

8. The vacuum heat insulator according to claim 7, wherein the fiber aggregate is processed into sheet by a needle-punching method and additionally followed by a thermal-bonding method.

9. The vacuum heat insulator according to claim 7, wherein the low-melting-point polyethylene terephthalate fiber has a low melting point of 110 to 170° C. and the high-melting-point polyethylene terephthalate fiber has a high-melting-point higher by 20° C. or more than the melting point of the low melting point fiber.

10. The vacuum heat insulator according to claim 9, wherein the low-melting-point polyethylene terephthalate fiber has a core/shell structure, the shell region is made of a low-melting-point polyethylene terephthalate, and the core region is made of a high-melting-point polyethylene terephthalate.

11. The vacuum heat insulator according to claim 9, wherein the blending ratio of the low-melting-point polyethylene terephthalate fiber to the high-melting-point polyethylene terephthalate fiber is 10:90 to 30:70 by weight.

12. The vacuum heat insulator according to claim 1, wherein the external packaging member has a sealed region formed by fusion at a peripheral edge area and an area inside the peripheral edge area in the external packaging member.

13. The vacuum heat insulator according to claim 1, wherein the vacuum heat insulator has a through-hole area and/or a notched area, and a sealed region formed by fusion at a peripheral area of the through-hole area and/or the notched area.

14. The vacuum heat insulator according to claim 1, wherein the external packaging member contains two or more core members and has sealed regions formed by fusion at a peripheral edge area of the external packaging member and an external periphery area of the core members in the external packaging member.

15. The vacuum heat insulator according to claim 1, wherein an internal packaging member containing the core member is contained in the external packaging member under reduced pressure.

16. The vacuum heat insulator according to claim 15, wherein the internal packaging member comprises polyethylene terephthalate.

* * * * *

UNITED STATES PATENT AND TRADEMARK OFFICE
CERTIFICATE OF CORRECTION

| | |
|---|---|
| PATENT NO. | : 7,947,347 B2 |
| APPLICATION NO. | : 11/632911 |
| DATED | : May 24, 2011 |
| INVENTOR(S) | : Hiroyuki Takashima et al. |

It is certified that error appears in the above-identified patent and that said Letters Patent is hereby corrected as shown below:

ON THE TITLE PAGE:

At item (73), Assignee, change:

"(73) Assignee: Kurashiki Bosek Kabushiki Kaisha, Kurashiki-shi (JP)"

to

--(73) Assignee: Kurashiki Boseki Kabushiki Kaisha, Kurashiki-shi (JP)--.

Signed and Sealed this
Ninth Day of August, 2011

David J. Kappos
*Director of the United States Patent and Trademark Office*